(12) United States Patent
Shima

(10) Patent No.: US 12,437,267 B2
(45) Date of Patent: Oct. 7, 2025

(54) CONFERENCE SUPPORT SYSTEM, CONFERENCE SUPPORT METHOD, AND RECORDING MEDIUM

(71) Applicant: Tomohiro Shima, Kanagawa (JP)

(72) Inventor: Tomohiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/178,779

(22) Filed: Mar. 6, 2023

(65) Prior Publication Data

US 2023/0206178 A1 Jun. 29, 2023

Related U.S. Application Data

(63) Continuation of application No. 16/801,628, filed on Feb. 26, 2020, now Pat. No. 11,625,681, which is a
(Continued)

(30) Foreign Application Priority Data

| Feb. 2, 2016 | (JP) | 2016-017939 |
| May 26, 2016 | (JP) | 2016-105601 |
| Jan. 13, 2017 | (JP) | 2017-004261 |

(51) Int. Cl.
*G10L 15/02* (2006.01)
*G06F 40/30* (2020.01)
(Continued)

(52) U.S. Cl.
CPC .............. *G06Q 10/10* (2013.01); *G06F 40/30* (2020.01); *G06Q 40/125* (2013.12); *G10L 15/02* (2013.01); *G10L 15/18* (2013.01); *H04L 65/403* (2013.01)

(58) Field of Classification Search
CPC ......... G06Q 10/10; G06F 40/30; G10L 15/02; G10L 15/18; H04L 65/403
See application file for complete search history.

(56) References Cited

U.S. PATENT DOCUMENTS

| 4,445,181 A | * | 4/1984 | Yatman ................... G04F 10/00 968/844 |
| 6,018,346 A | * | 1/2000 | Moran ................. G06Q 10/109 715/835 |

(Continued)

FOREIGN PATENT DOCUMENTS

| CN | 101777160 | 7/2010 |
| CN | 101777160 A | * 7/2010 |

(Continued)

OTHER PUBLICATIONS

G. Tur et al., "The CALO Meeting Assistant System," in IEEE Transactions on Audio, Speech, and Language Processing, vol. 18, No. 6, pp. 1601-1611, Aug. 2010, doi: 10.1109/TASL.2009.2038810. (Year: 2010).*

(Continued)

*Primary Examiner* — Ashford S Hayles
(74) *Attorney, Agent, or Firm* — IPUSA, PLLC

(57) ABSTRACT

A conference support system is for supporting a conference. The conference support system includes one or more information processing apparatuses for implementing various functions of the conference support system. The conference support system includes an inputter configured to input a statement content that is a content of a statement stated by a participant of the conference; a determiner configured to determine a statement type of the statement content, based on the statement content input by the inputter; and an outputter configured to output at least one of the statement content, an evaluation of the conference, and an evaluation of the participant, based on a determination result obtained by the determiner.

22 Claims, 20 Drawing Sheets

Related U.S. Application Data continuation of application No. 15/413,625, filed on Jan. 24, 2017, now Pat. No. 10,614,418.

(51) Int. Cl.
*G06Q 10/10* (2023.01)
*G06Q 40/12* (2023.01)
*G10L 15/18* (2013.01)
*H04L 65/403* (2022.01)

(56) References Cited

U.S. PATENT DOCUMENTS

| | | | | |
|---|---|---|---|---|
| 7,231,423 | B1* | 6/2007 | Horstmann | H04W 4/12 709/204 |
| 7,398,203 | B2* | 7/2008 | Corston-Oliver | G06F 40/295 704/9 |
| 8,027,998 | B2 | 9/2011 | Uehori et al. | |
| 8,200,520 | B2* | 6/2012 | Chen | G06Q 10/109 705/7.18 |
| 8,352,245 | B1* | 1/2013 | Lloyd | G10L 15/22 704/9 |
| 8,458,057 | B1* | 6/2013 | Youngs | G06Q 10/1095 705/32 |
| 8,510,399 | B1* | 8/2013 | Byttow | H04L 12/1822 707/771 |
| 9,218,339 | B2* | 12/2015 | Zechner | G10L 15/1815 |
| 9,245,254 | B2* | 1/2016 | Lord | G06Q 10/10 |
| 9,269,073 | B2* | 2/2016 | Sammon | G06Q 10/109 |
| 9,270,711 | B1* | 2/2016 | Rowland | H04L 12/18 |
| 9,332,221 | B1* | 5/2016 | Breedvelt-Schouten | H04L 12/1827 |
| 9,349,299 | B1* | 5/2016 | Thom | G09B 7/00 |
| 9,484,033 | B2* | 11/2016 | Bufe | G10L 15/26 |
| 9,578,073 | B2* | 2/2017 | Bader-Natal | H04L 65/403 |
| 9,652,113 | B1* | 5/2017 | Colson | G06Q 10/1095 |
| 9,691,412 | B2* | 6/2017 | Totzke | G10L 25/63 |
| 10,218,588 | B1* | 2/2019 | Brisebois | G06Q 10/1095 |
| 10,296,861 | B2* | 5/2019 | Krantz | G06F 3/0484 |
| 10,613,825 | B2* | 4/2020 | Moorjani | H04L 65/403 |
| 10,755,236 | B2* | 8/2020 | Callanan | G06Q 10/1095 |
| 10,979,487 | B2* | 4/2021 | Burtner | G06Q 10/10 |
| 11,062,270 | B2* | 7/2021 | Hilleli | G06N 7/01 |
| 2003/0227479 | A1* | 12/2003 | Mizrahi | G06Q 30/02 715/753 |
| 2004/0064317 | A1* | 4/2004 | Othmer | H04L 67/306 704/E15.047 |
| 2004/0114541 | A1* | 6/2004 | Caspi | H04L 65/1104 709/204 |
| 2004/0236830 | A1* | 11/2004 | Nelson | H04L 65/1104 709/204 |
| 2005/0010464 | A1* | 1/2005 | Okuno | G06Q 10/06375 705/7.12 |
| 2005/0034079 | A1* | 2/2005 | Gunasekar | H04M 3/567 715/756 |
| 2005/0131744 | A1* | 6/2005 | Brown | H04L 12/1831 705/7.29 |
| 2005/0210105 | A1* | 9/2005 | Hirata | G06F 16/739 709/205 |
| 2005/0265264 | A1* | 12/2005 | Hering | H04L 65/4015 370/260 |
| 2006/0047816 | A1* | 3/2006 | Lawton | H04L 51/04 709/227 |
| 2006/0080614 | A1* | 4/2006 | Lentz | H04N 7/15 348/E7.083 |
| 2006/0149558 | A1* | 7/2006 | Kahn | G10L 15/063 704/278 |
| 2006/0195354 | A1* | 8/2006 | Borovoy | G06Q 10/06398 705/7.42 |
| 2007/0033005 | A1* | 2/2007 | Cristo | G10L 15/19 704/9 |
| 2007/0071206 | A1* | 3/2007 | Gainsboro | H04M 3/42221 379/168 |
| 2007/0100986 | A1* | 5/2007 | Bagley | G06Q 10/10 709/224 |
| 2007/0106724 | A1* | 5/2007 | Gorti | H04M 3/56 709/204 |
| 2007/0124682 | A1* | 5/2007 | Fukeda | G06Q 10/109 715/730 |
| 2007/0299911 | A1* | 12/2007 | Mizunashi | G06Q 10/10 709/204 |
| 2008/0022209 | A1* | 1/2008 | Lyle | G06Q 10/109 715/730 |
| 2008/0189624 | A1* | 8/2008 | Chotai | H04L 65/403 348/E7.083 |
| 2008/0255847 | A1* | 10/2008 | Moriwaki | G10L 21/06 704/270.1 |
| 2009/0198495 | A1* | 8/2009 | Hata | G10L 15/04 704/E17.001 |
| 2009/0204399 | A1* | 8/2009 | Akamine | G10L 15/1822 704/235 |
| 2009/0319916 | A1* | 12/2009 | Gudipaty | H04N 7/15 715/753 |
| 2010/0034366 | A1* | 2/2010 | Basson | G10L 15/26 379/202.01 |
| 2010/0037151 | A1* | 2/2010 | Ackerman | G06Q 10/10 715/753 |
| 2010/0251142 | A1* | 9/2010 | Geppert | H04W 4/21 715/758 |
| 2010/0274618 | A1* | 10/2010 | Byrd | G06Q 10/10 704/275 |
| 2010/0306018 | A1* | 12/2010 | Burtner | G06Q 10/10 705/7.19 |
| 2011/0040591 | A1* | 2/2011 | Durocher | G06Q 10/06375 705/7.35 |
| 2011/0055227 | A1* | 3/2011 | Igarashi | H04N 7/15 707/750 |
| 2011/0060591 | A1* | 3/2011 | Chanvez | G10L 15/26 340/573.1 |
| 2011/0138303 | A1* | 6/2011 | Ark | H04L 12/1831 715/753 |
| 2011/0267419 | A1* | 11/2011 | Quinn | G06F 3/04842 348/E7.083 |
| 2011/0270609 | A1 | 11/2011 | Jones et al. | |
| 2011/0295392 | A1* | 12/2011 | Cunnington | G06Q 10/10 702/19 |
| 2012/0179465 | A1* | 7/2012 | Cox | G10L 15/26 704/235 |
| 2012/0191454 | A1* | 7/2012 | Gabara | G06F 16/953 704/E17.001 |
| 2012/0303421 | A1* | 11/2012 | Yokoi | G06Q 10/06 705/7.42 |
| 2012/0321062 | A1* | 12/2012 | Fitzsimmons | H04L 65/4015 379/202.01 |
| 2012/0323575 | A1* | 12/2012 | Gibbon | G06F 3/167 704/E17.001 |
| 2013/0018957 | A1* | 1/2013 | Parnaby | G06Q 30/0203 709/204 |
| 2013/0081056 | A1* | 3/2013 | Hu | G06F 16/35 719/313 |
| 2013/0091440 | A1* | 4/2013 | Kotler | G06Q 10/10 715/753 |
| 2013/0144595 | A1* | 6/2013 | Lord | G06F 40/58 704/2 |
| 2013/0144597 | A1* | 6/2013 | Waibel | G10L 15/18 704/2 |
| 2013/0254279 | A1* | 9/2013 | Bentley | H04L 65/403 709/204 |
| 2013/0263020 | A1* | 10/2013 | Heiferman | H04L 12/1818 715/753 |
| 2013/0311181 | A1* | 11/2013 | Bachtiger | G06F 16/345 704/235 |
| 2013/0325972 | A1* | 12/2013 | Boston | G06Q 10/10 709/204 |
| 2014/0006064 | A1* | 1/2014 | Joao | H04L 65/403 705/14.54 |
| 2014/0019132 | A1* | 1/2014 | Kuwabara | G10L 25/57 704/257 |

(56) References Cited

U.S. PATENT DOCUMENTS

| | | | |
|---|---|---|---|
| 2014/0059010 A1* | 2/2014 | Uchida | H04N 7/155 707/661 |
| 2014/0067375 A1* | 3/2014 | Wooters | G06F 40/35 704/9 |
| 2014/0068463 A1* | 3/2014 | Kay | H04L 12/1822 715/753 |
| 2014/0081643 A1* | 3/2014 | John | G10L 15/08 704/E21.001 |
| 2014/0095418 A1* | 4/2014 | Scholand | G06T 11/206 706/46 |
| 2014/0108085 A1* | 4/2014 | Henriksen | G06Q 10/109 705/7.19 |
| 2014/0136626 A1* | 5/2014 | Teevan | G06F 15/00 709/205 |
| 2014/0173491 A1* | 6/2014 | Kawakubo | G06Q 10/06 715/772 |
| 2014/0181696 A1* | 6/2014 | Christensen | H04L 12/1818 715/756 |
| 2014/0198174 A1* | 7/2014 | Sanso | H04N 7/15 704/235 |
| 2014/0229471 A1* | 8/2014 | Galvin, Jr. | G06F 16/30 707/723 |
| 2014/0237389 A1* | 8/2014 | Ryall | G06F 3/0481 715/753 |
| 2014/0253672 A1* | 9/2014 | Bank | H04L 65/403 348/14.08 |
| 2014/0297641 A1* | 10/2014 | Mayumi | H04L 65/403 707/748 |
| 2014/0362165 A1* | 12/2014 | Ackerman | G06Q 10/10 348/14.07 |
| 2015/0012270 A1* | 1/2015 | Reynolds | G10L 25/87 704/233 |
| 2015/0088997 A1* | 3/2015 | van Dijk | G06Q 10/109 709/224 |
| 2015/0120680 A1* | 4/2015 | Alonso | G06F 16/9535 707/722 |
| 2015/0142800 A1* | 5/2015 | Thapliyal | G06F 16/285 707/737 |
| 2015/0193429 A1* | 7/2015 | Bohra | G06F 16/3329 704/9 |
| 2015/0195406 A1* | 7/2015 | Dwyer | G10L 15/02 379/265.07 |
| 2015/0348538 A1* | 12/2015 | Donaldson | G10L 15/26 704/235 |
| 2015/0373063 A1* | 12/2015 | Vashishtha | H04N 7/155 348/14.07 |
| 2016/0042226 A1* | 2/2016 | Cunico | H04N 7/152 382/103 |
| 2016/0049094 A1* | 2/2016 | Gupta | G09B 7/02 434/185 |
| 2016/0073054 A1* | 3/2016 | Balasaygun | H04L 12/1822 348/14.08 |
| 2016/0073059 A1* | 3/2016 | Bader-Natal | H04N 7/148 348/14.03 |
| 2016/0098480 A1* | 4/2016 | Nowson | G06F 40/30 707/738 |
| 2016/0104094 A1* | 4/2016 | Yom-Tov | G06Q 10/109 705/7.41 |
| 2016/0117624 A1* | 4/2016 | Flores | H04L 67/306 705/7.39 |
| 2016/0125346 A1* | 5/2016 | Krantz | G06F 3/0484 705/7.41 |
| 2016/0170967 A1* | 6/2016 | Allen | G10L 25/63 704/9 |
| 2016/0171983 A1* | 6/2016 | Bufe | G10L 15/26 704/235 |
| 2016/0269254 A1* | 9/2016 | Forney | H04L 65/403 |
| 2016/0269450 A1* | 9/2016 | Tondepu | G06Q 10/1095 |
| 2016/0284354 A1* | 9/2016 | Chen | H04N 7/15 |
| 2016/0337413 A1* | 11/2016 | Sallam | G06F 16/433 |
| 2016/0379169 A1 | 12/2016 | Chiyo et al. | |
| 2017/0039527 A1* | 2/2017 | Rangan | G06Q 10/1095 |
| 2017/0116986 A1* | 4/2017 | Weng | G10L 13/033 |
| 2017/0220997 A1 | 8/2017 | Shima | |
| 2018/0006837 A1* | 1/2018 | Cartwright | H04N 7/147 |
| 2018/0098030 A1* | 4/2018 | Morabia | H04L 65/403 |
| 2018/0144287 A1* | 5/2018 | Drayton | G06Q 30/0635 |
| 2018/0336902 A1* | 11/2018 | Cartwright | G06F 16/61 |
| 2022/0207392 A1* | 6/2022 | Hou | G10L 15/26 |

FOREIGN PATENT DOCUMENTS

| | | | |
|---|---|---|---|
| DE | 19802869 | 7/1999 | |
| DE | 19802869 A1 * | 7/1999 | G06G 1/0089 |
| IN | 202341048742 A * | 11/2023 | |
| JP | H11-025099 | 1/1999 | |
| JP | 2000-099570 | 4/2000 | |
| JP | 2000-286844 | 10/2000 | |
| JP | 2000286844 A * | 10/2000 | |
| JP | 2005-277462 | 10/2005 | |
| JP | 2007-043493 | 2/2007 | |
| JP | 2007212532 A * | 8/2007 | H04M 3/42221 |
| JP | 2008140089 A * | 6/2008 | |
| JP | 2008-262046 | 10/2008 | |
| JP | 4335340 | 9/2009 | |
| JP | 4335340 B2 * | 9/2009 | G06Q 10/109 |
| JP | 2010-055307 | 3/2010 | |
| JP | 2011-034358 | 2/2011 | |
| JP | 2011034358 A * | 2/2011 | |
| JP | 2011-060054 | 3/2011 | |
| JP | 2011060054 A * | 3/2011 | |
| JP | 2011-081504 | 4/2011 | |
| JP | 2012208630 A * | 10/2012 | |
| JP | 2013-182306 | 9/2013 | |
| JP | 2014-179010 | 9/2014 | |
| JP | 2015-088913 | 5/2015 | |
| JP | 2015-121864 | 7/2015 | |
| JP | 2015-153408 | 8/2015 | |
| JP | 2015-170342 | 9/2015 | |
| JP | 2018067310 A * | 4/2018 | |
| JP | 2022-130635 | 9/2022 | |
| KR | 20160036949 | 4/2016 | |
| KR | 20160036949 A * | 4/2016 | |
| NL | 1012226 | 12/2000 | |
| NL | 1012226 C2 * | 12/2000 | G07C 1/10 |
| WO | 2000/75877 | 12/2000 | |
| WO | WO-0075877 A1 * | 12/2000 | G07C 1/10 |
| WO | WO-2011099086 A1 * | 8/2011 | G10L 15/26 |
| WO | 2011/137286 | 11/2011 | |
| WO | WO-2011137286 A3 * | 1/2012 | G10L 15/26 |
| WO | 2015/182559 | 12/2015 | |
| WO | 2016/043110 | 3/2016 | |
| WO | WO-2016043110 A1 * | 3/2016 | G06F 3/04842 |
| WO | 2016/126767 | 8/2016 | |
| WO | 2016/126770 | 8/2016 | |
| WO | 2016/126816 | 8/2016 | |
| WO | WO-2016126767 A1 * | 8/2016 | G06F 16/61 |
| WO | WO-2016126770 A2 * | 8/2016 | G10L 15/02 |
| ZA | 9301124 | 12/1993 | |
| ZA | 9301124 A * | 12/1993 | |

OTHER PUBLICATIONS

Patrick Chiu, John Boreczky, Andreas Girgensohn, and Don Kimber. 2001. LiteMinutes: an Internet-based system for multimedia meeting minutes. In Proceedings of the 10th international conference on World Wide Web (WWW '01). Association for Computing Machinery, New York, NY, USA, 140-149. (Year: 2001).*

Japanese Office Action for 2017-004261 mailed on Feb. 2, 2021.

Japanese Office Action for 2017-004261 mailed on Nov. 2, 2021.

Xia, Feng et al. "Socially-Aware Venue Recommendation for Conference Participants." 2013 IEEE 10th International Conference on Ubiquitous Intelligence and Computing and 2013 IEEE 10th International Conference on Autonomic and Trusted Computing (2013) : 134-141. (Year: 2013).

Japanese Office Action for 2024-130620 mailed on Aug. 19, 2025.

* cited by examiner

FIG.6

DECEMBER 21, 2015 (MON)

13:48

10 MINUTES REMAINING

| 15 | 15 | 66% |

LET'S SUMMARIZE

TO SUMMARY/SAVING SCREEN

STORE CONFERENCE MINUTES

SATO
SAITO
SUZUKI
TANAKA
TAKAHASHI
YAMADA
NAKAMURA
KOBAYASHI 401
402

AGENDA
1. ABOUT XXX

GOAL
1. XXX IS SHARED

Q. DOES XXX CORRESPOND TO XX? (SATO)
A: NO. IT IS XX (SAITO)
PROPOSAL: I THINK WE SHOULD XXX (SUZUKI)
OPINION (P): I ALSO THINK XX IS A GOOD IDEA (TANAKA)
INFORMATION: IT SEEMS LIKE XXX (TAKAHASHI)
OPINION (N): I DON'T THINK XXX IS GOOD (TAKAHASHI)
PROPOSAL: WE SHOULD NOT ADOPT XXXXXXXX (TAKAHASHI)
PROBLEM: THEN, WE NEED TO DO XXX (NAKAMURA)
A. 1 CANDIDATE: I WILL DO XXX (KOBAYASHI)

PLEASE INPUT HERE

| SATO/F2 | SAITO/F3 | SUZUKI/F4 | TANAKA/F5 |
| TAKAHASHI/F6 | YAMADA/F7 | NAKAMURA/F8 | KOBAYASHI/F9 |

FIG.12

801 — AGENDA
1. EXCHANGE INFORMATION ABOUT DISCUSSION STATUS OF CONFERENCE SUPPORT

802 — GOAL
1. THEME OVERVIEWS AND STATUSES ARE MUTUALLY UNDERSTOOD

803 — CONCLUSION
PLEASE INPUT CONCLUSION  (REGISTER)

A.I

804 — PLEASE INPUT ACTION ITEM

| PERSON IN CHARGE ▽ |
| --- |
| EVERYONE |
| SATO |
| SAITO |
| SUZUKI |
| TANAKA |
| TAKAHASHI |
| YAMADA |
| NAKAMURA |
| KOBAYASHI |

DUE DATE (REGISTER)  (SUMMARY OF)

DECEMBER 2015

| SUN | MON | TUE | WED | THU | FRI | SAT |
| --- | --- | --- | --- | --- | --- | --- |
|  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

FIG.14

DECEMBER 21, 2015 (MON)

13:48

10 MINUTES REMAINING

| 15 | 15 |
|---|---|
| | 66% |

LET'S SUMMARIZE

TO SUMMARY/ SAVING SCREEN

STORE CONFERENCE MINUTES

SATO
SAITO
SUZUKI
TANAKA
TAKAHASHI
YAMADA
NAKAMURA
KOBAYASHI

AGENDA
1. ABOUT XXX

GOAL
1. XXX IS SHARED

Q. DOES XXX CORRESPOND TO XX? (SATO)
A: NO. IT IS XX (SAITO)
PROPOSAL: I THINK WE SHOULD XXX (SUZUKI) — 1002
OPINION (P): I ALSO THINK XX IS A GOOD IDEA (TANAKA)
INFORMATION: IT SEEMS LIKE XXX (TAKAHASHI)
OPINION (N): I DON'T THINK XXX IS GOOD (TAKAHASHI)
PROPOSAL: WE SHOULD NOT ADOPT XXXXXXX (TAKAHASHI)
PROBLEM: THEN, WE NEED TO DO XXX (NAKAMURA)
A. I CANDIDATE: I WILL DO XXX (KOBAYASHI)

👍GOOD! 👍GOOD! 👍GOOD! 👍GOOD! 👍GOOD! 👍GOOD! — 1001

PLEASE INPUT HERE

| SATO/F2 | SAITO/F3 | SUZUKI/F4 | TANAKA/F5 |
| TAKAHASHI/F6 | YAMADA/F7 | NAKAMURA/F8 | KOBAYASHI/F9 |

FIG.19

| AGENDA | ABOUT NEW FUNCTION OF CONFERENCE SUPPORT SYSTEM |
|---|---|
| GOAL | IDEA OF FUNCTION TO BE INSTALLED IN NEXT VERSION IS PREPARED |
| DETERMINATION ITEM | PROCEED IN DIRECTION OF INSTALLING AUTOMATIC ABSTRACT FUNCTION IN NEXT VERSION |
| A.I | CAN YOU PLEASE EXAMINE THE TECHNICAL TRENDS IN AUTOMATIC ABSTRACTS? |

DUE DATE (REGISTER)

AUGUST 2016
| SUN | MON | TUE | WED | THU | FRI | SAT |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |  |  |  |

PERSON IN CHARGE ▽
EVERYONE
TANAKA
SAITO
SUZUKI
TANAKA
TAKAHASHI
YAMADA
NAKAMURA
KOBAYASHI

AL----
--INBX

SUZUKI: IN ANY CASE, IF ALL OF THE STATEMENTS THAT HAVE BEEN OBTAINED BY VOICE SOUND RECOGNITION ARE DISPLAYED, THE STATEMENT RECORD BECOMES ENORMOUS, AND THE READABILITY IS VERY BAD, AND THEREFORE I THINK A FUNCTION SUCH AS AUTOMATIC ABSTRACT IS NECESSARY.
TAKAHASHI: THEN LET'S PROCEED IN THE DIRECTION OF INSTALLING A FUNCTION OF AUTOMATIC ABSTRACT.
TAKAHASHI: CAN YOU PLEASE EXAMINE THE TECHNICAL TRENDS IN AUTOMATIC ABSTRACTS?
SUZUKI: ALL RIGHT.

SUZUKI: HOW ABOUT AUTOMATIC ABSTRACT?
YAMADA: HOW ABOUT EVALUATING THE CONFERENCE?
KOBAYASHI: HOW ABOUT ACQUIRING INFORMATION RELEVANT TO THE DISCUSSION FROM THE WEBSITE AND PRESENTING THE INFORMATION?
TANAKA: TO START WITH, DON'T WE NEED TO FIRST DETERMINE THE BUSINESS AREA TO BE AIMED AND THE END USERS?
SUZUKI: IN ANY CASE, IF ALL OF THE STATEMENTS THAT HAVE BEEN OBTAINED BY VOICE SOUND RECOGNITION ARE DISPLAYED, THE STATEMENT RECORD BECOMES ENORMOUS, AND THE READABILITY IS VERY BAD, AND THEREFORE I THINK A FUNCTION SUCH AS AUTOMATIC ABSTRACT IS NECESSARY.
TAKAHASHI: THEN LET'S PROCEED IN THE DIRECTION OF INSTALLING A FUNCTION OF AUTOMATIC ABSTRACT.
TAKAHASHI: CAN YOU PLEASE EXAMINE THE TECHNICAL TRENDS IN AUTOMATIC ABSTRACTS?
SUZUKI: ALL RIGHT.
KOBAYASHI: INCIDENTALLY, I HAVE HEARD THAT COMPANY A HAS LAUNCHED A TOOL FOR SUPPORTING BRAINSTORMING.
TANAKA: THAT TOOL IS USED UNDER TRIAL BASIS AT OUR COMPANY, BUT IT'S NOT VERY GOOD. AFTER ALL, NO ONE IS USING IT NOW.
KOBAYASHI: REALLY? IS IT DIFFICULT TO USE?
(OMITTED BELOW)

CONFERENCE SUPPORT SYSTEM, CONFERENCE SUPPORT METHOD, AND RECORDING MEDIUM

CROSS-REFERENCE TO RELATED APPLICATION

This application is a continuation of U.S. patent application Ser. No. 16/801,628, filed on Feb. 26, 2020, which is a continuation of U.S. patent application Ser. No. 15/413,625, filed on Jan. 24, 2017, which claims priority to Japanese Patent Application No. 2016-017939, filed on Feb. 2, 2016, Japanese Patent Application No. 2016-105601, filed on May 26, 2016, and Japanese Patent Application No. 2017-004261, filed on Jan. 13, 2017, the contents of which are incorporated herein by reference in their entirety.

BACKGROUND OF THE INVENTION

1. Field of the Invention

The present invention relates to a conference support system, a conference support method, and a recording medium.

2. Description of the Related Art

There is known a method in the related art for managing the progress of a conference by a conference support system. The conference support system manages the progress of a conference in order to reduce the load of cumbersome operations such as time adjustment, and to allow the chairman to concentrate on the proceeding contents and accurately expedite the proceedings. In this method, the conference support system displays the progress of the conference, and controls the display according to the proceedings of the conference. Specifically, first, the conference support system sets the scheduled proceeding time required for each proceeding topic in advance, with respect to a plurality of conference agendas, and creates a timetable for the entire conference. Next, the conference support system displays an index indicating the elapsed time of the conference agenda item, according to need. Furthermore, the conference support system detects the end of the proceeding item, and shifts the index to the next conference agenda. Then, the conference support system reallocates the remaining scheduled proceeding time with respect to the remaining conference agendas, at the time point when a conference agenda has ended. In this way, the conference support system automatically adjusts the time such that the conference ends within the scheduled proceeding time, and therefore the load of operations for time adjustment is reduced. Thus, the chairman is able to concentrate on the proceeding contents and accurately manage the progress of the proceedings (see, for example, Patent Document 1).

Patent Document 1: Japanese Unexamined Patent Application Publication No. 2007-43493

SUMMARY OF THE INVENTION

An aspect of the present invention provides a conference support system, a conference support method, and a recording medium, in which one or more of the above-described disadvantages are reduced.

According to one aspect of the present invention, there is provided a conference support system for supporting a conference, the conference support system including one or more information processing apparatuses for implementing various functions of the conference support system, the conference support system including an inputter configured to input a statement content that is a content of a statement stated by a participant of the conference; a determiner configured to determine a statement type of the statement content, based on the statement content input by the inputter; and an outputter configured to output at least one of the statement content, an evaluation of the conference, and an evaluation of the participant, based on a determination result obtained by the determiner.

BRIEF DESCRIPTION OF THE DRAWINGS

Other objects, features and advantages of the present invention will become more apparent from the following detailed description when read in conjunction with the accompanying drawings, in which:

FIG. 6 illustrates an example where an alert and the remaining time are displayed on a screen displayed by the conference support system according to the first embodiment of the present invention;

FIG. 12 illustrates an example of a summary screen displayed by the conference support system according to the second embodiment of the present invention;

FIG. 14 illustrates an example of a screen for inputting a subjective evaluation displayed by the conference support system according to the second embodiment of the present invention;

FIG. 19 illustrates an example of displayed results extracted by the conference support system according to the fourth embodiment of the present invention.

DETAILED DESCRIPTION OF THE PREFERRED EMBODIMENTS

The method of the related art, for managing the progress of a conference, merely manages the time of each agenda in the conference. On the other hand, there has been demand to efficiently hold a conference by making the contents of the conference visible.

A problem to be solved by an embodiment of the present invention is to provide a conference support system that can increase the efficiency of a conference.

Embodiments of the present invention will be described by referring to the accompanying drawings.

First Embodiment (Overall Configuration)

Figure 1:
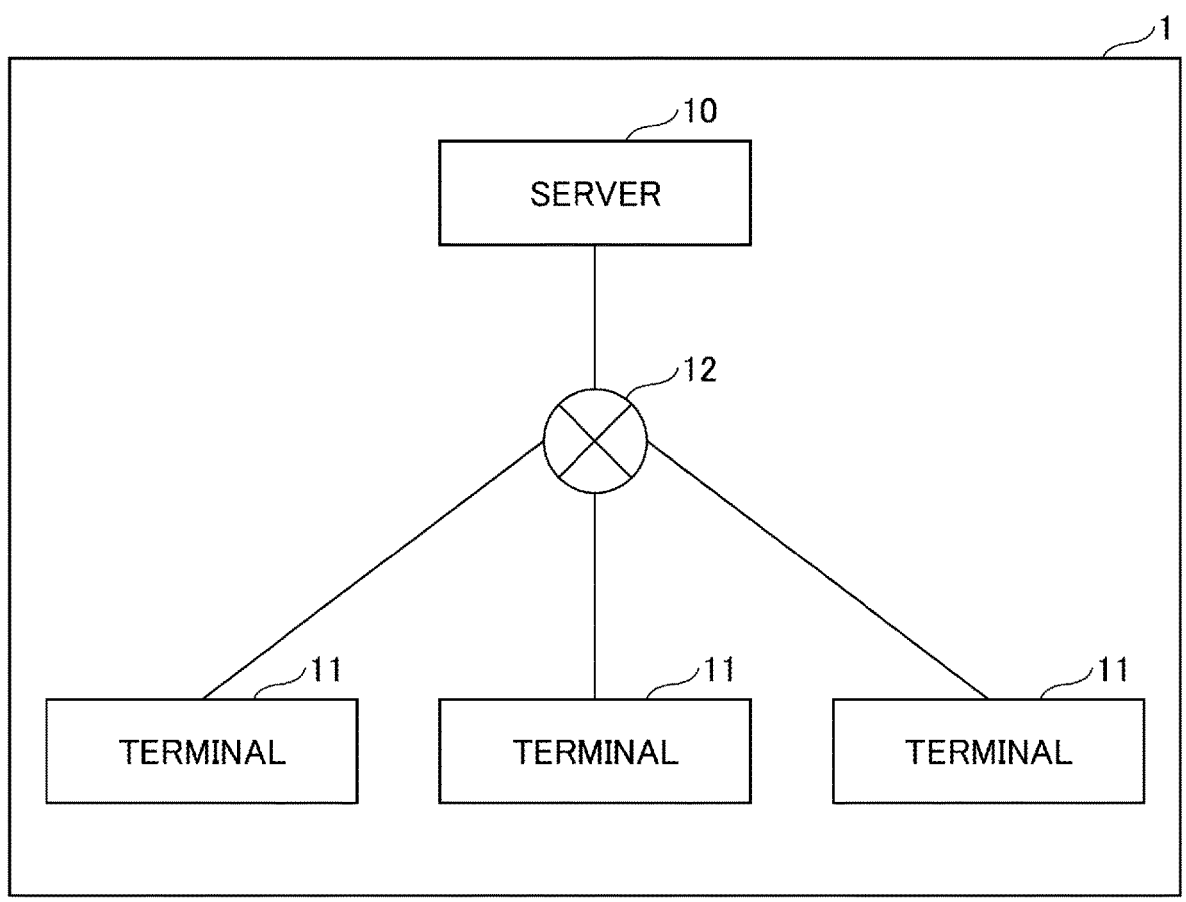
FIG. 1 is a conceptual diagram for describing an example of the overall configuration of a conference support system according to a first embodiment of the present invention.

FIG. 1 is a conceptual diagram for describing an example of the overall configuration of a conference support system according to a first embodiment of the present invention. For example, as illustrated, a conference support system 1 includes a server 10 that is an example of a conference support apparatus, and one or more terminals 11. Furthermore, the server 10 and the terminals 11 are coupled via a network 12. Furthermore, the server 10 and the terminals 11 are information processing apparatuses such as a personal computer (PC), having a hardware configuration, for example, as described below.

(Hardware Configuration)

Figure 2:
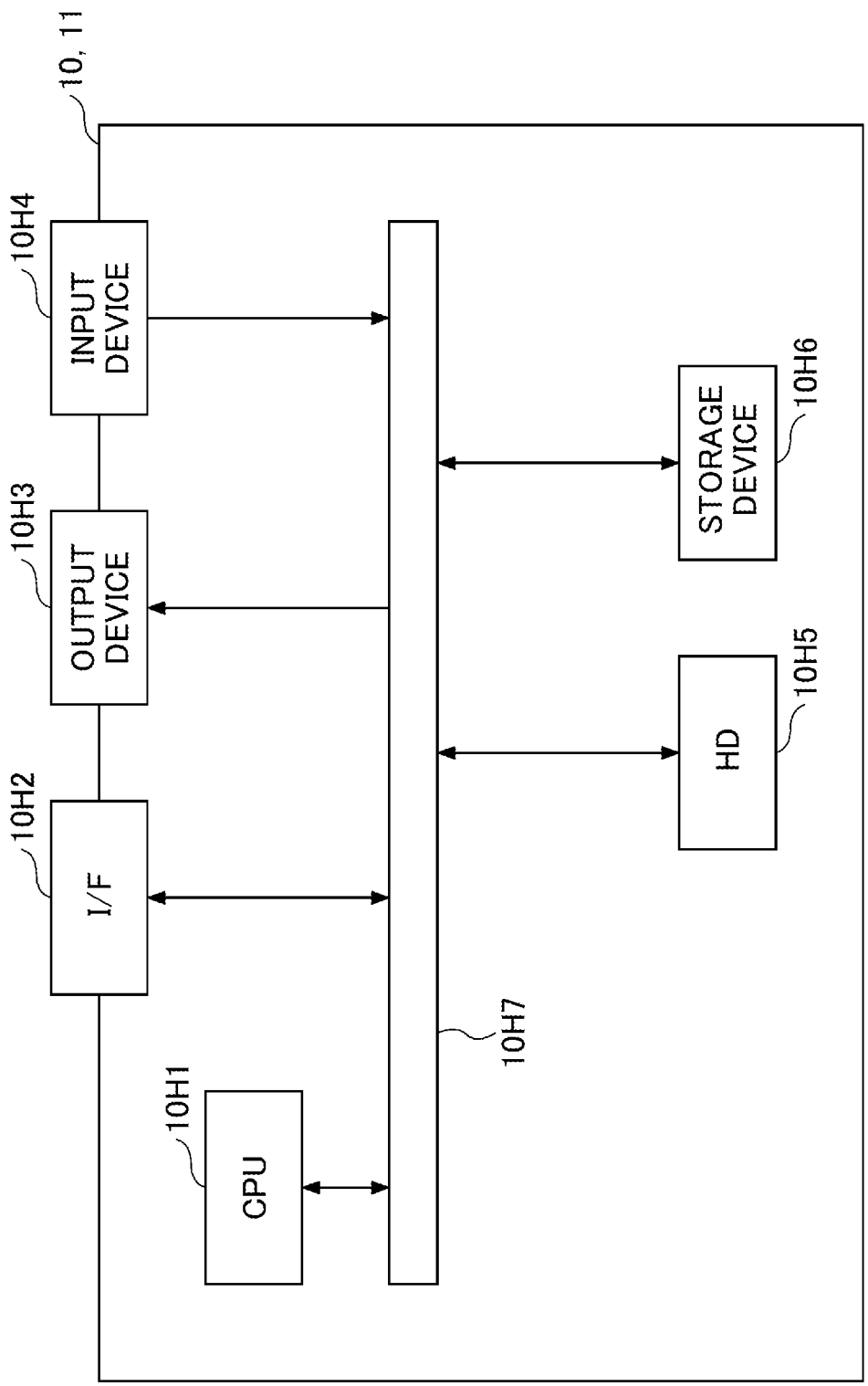
FIG. 2 is an example of a hardware block diagram of an information processing apparatus according to an embodiment of the present invention.

FIG. 2 is an example of a hardware block diagram of an information processing apparatus according to an embodiment of the present invention. For example, the server 10 and the terminal 11 include a central processing unit (CPU) 10H1, an interface (I/F) 10H2, and an output device 10H3. Furthermore, the server 10 and the terminal 11 include an input device 10H4, a hard disk (HD) 10H5, and a storage device 10H6. Furthermore, the hardware elements are coupled to each other by a bus 10H7. Note that the server 10 and the plurality of terminals 11 may have the same hardware configuration or may have different hardware configurations. In this example described below, the server 10 and the plurality of terminals 11 have the same hardware configuration, and the server 10 is taken as an example.

The CPU 10H1 is an arithmetic device for performing calculations to implement processing of various processes and various kinds of data, and a control device for controlling the hardware elements, etc. Note that the server 10 may include a plurality of arithmetic devices or control devices.

The I/F 10H2 is, for example, a connector and a process integrated circuit (IC), etc. For example, the I/F 10H2 sends and receives data with an external device via a network, etc.

The output device 10H3 is a display, etc., for displaying a display screen and a graphical user interface (GUI), etc.

The input device 10H4 is a touch panel, a keyboard, a mouse, and a microphone, or a combination of these elements, etc., used by the user for inputting operations, etc. Note that the microphone is preferably a so-called directional microphone, which can recognize the direction of the sound source.

The HD 10H5 is an example of a secondary storage device. That is, the HD 10H5 stores programs and files used for processes or data of various settings, etc.

The storage device 10H6 is a so-called memory, etc. That is, the programs or data, etc. stored in the HD 10H5 are loaded in the storage device 10H6.

(Functional Configuration Example)

Figure 3:
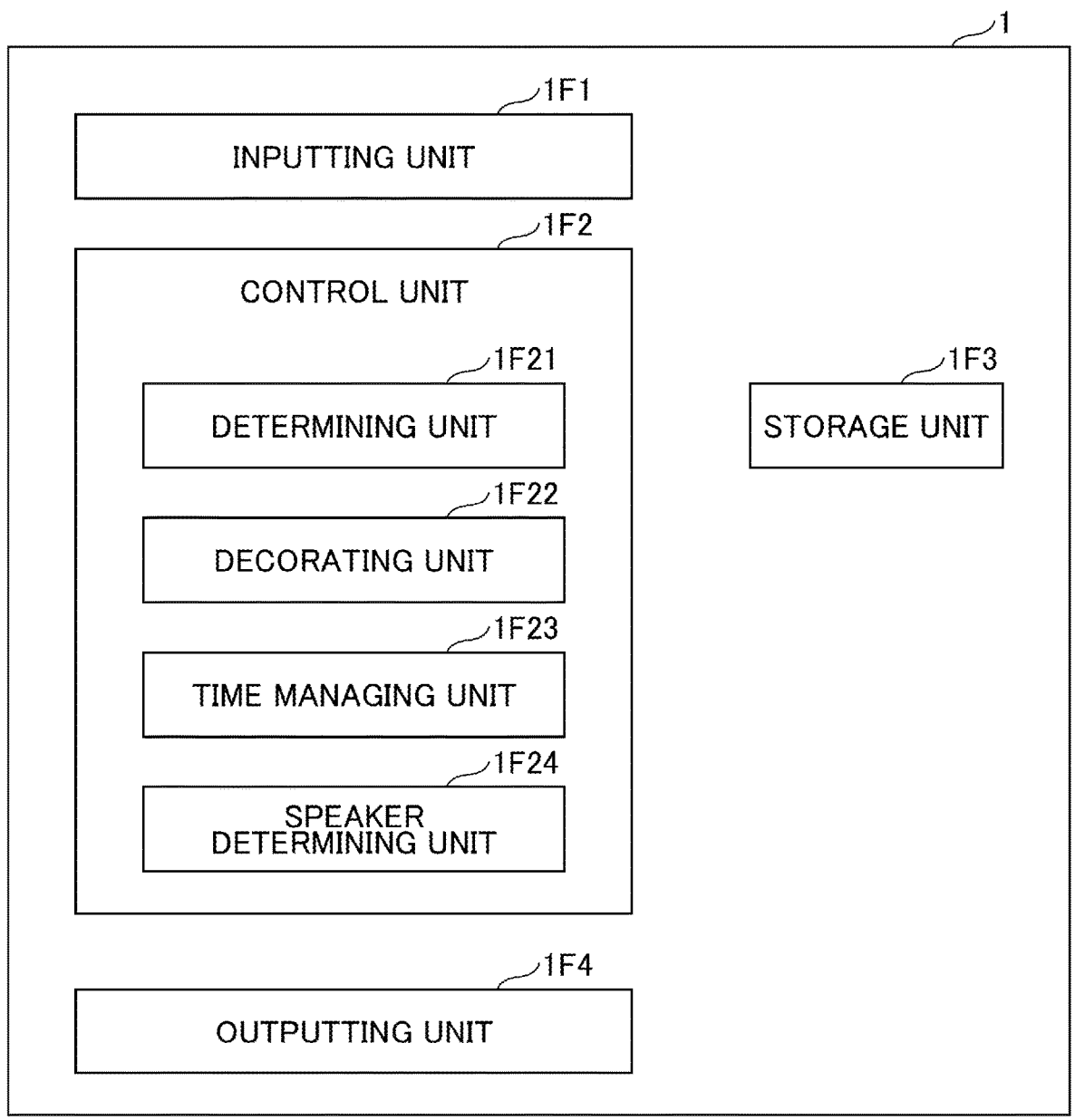
FIG. 3 is a functional block diagram of an example of the conference support system according to the first embodiment of the present invention.

FIG. 3 is a functional block diagram of an example of the conference support system 1 according to the first embodiment of the present invention. For example, the conference support system 1 includes an inputting unit 1F1, a control unit 1F2, a storage unit 1F3, and an outputting unit 1F4.

For example, in the conference support system 1, the terminal 11 (FIG. 1) includes the inputting unit 1F1 and the outputting unit 1F4. Furthermore, the server 10 (FIG. 1) includes the control unit 1F2 and the storage unit 1F3. Note that the respective units may be included in either the terminal 11 or the server 10.

The inputting unit 1F1 inputs the content of the statement stated in a conference (statement content). For example, the inputting unit 1F1 is realized by the input device 10H4 (FIG. 2), etc.

The control unit 1F2 implements control to realize the respective processes. Specifically, the control unit 1F2 includes a determining unit 1F21. Furthermore, as illustrated, the control unit 1F2 may also include a decorating unit 1F22, a time managing unit 1F23, and a speaker determining unit 1F24. For example, the control unit 1F2 is realized by the CPU 10H1 (FIG. 2), etc.

The storage unit 1F3 stores data, etc., that is input in in advance. The storage unit 1F3 realizes a database, etc. Furthermore, the storage unit 1F3 stores statement contents. For example, the storage unit 1F3 is realized by the HD 10H5 (FIG. 2) and the storage device 10H6 (FIG. 2), etc.

The outputting unit 1F4 displays or prints, etc., conference contents, and outputs the conference contents, such as the conference minutes, an evaluation result, an abstract, statement contents, a determination result, or a combination of these items, to the participates, etc., of the conference, in a mode set in advance. For example, the outputting unit 1F4 is realized by the output device 10H3 (FIG. 2), etc.

First, in the conference support system 1, during a conference, a statement content made in the conference is input by the person who has stated the statement content (hereinafter, "speaker") or the minute taker, etc., to the inputting unit 1F1. Specifically, for example, the statement content is input in a text format with a keyboard, etc. Note that the statement contents may be contents input with a keyboard, etc., after the participant has orally made a statement. In another example, when the participant inputs the contents that the participant wants to state with a keyboard in an online conference, etc., held between remote locations by using chat, etc., the statement contents may be the contents input by chat, etc. Said differently, the statement contents are not limited to contents that are stated orally. That is, the statement contents may not be stated orally, but may be contents that are input with a keyboard, etc.

In another example, the statement contents may be input by voice sound with a microphone, etc. That is, when the statement contents are input by voice sound, the conference support system 1 may recognize the input voice sound and generate text data, etc., based on the recognized voice sound. Furthermore, the statement contents may be input by handwriting in an electronic blackboard or a tablet terminal, etc. That is, when the statement contents are input by handwritten characters, the conference support system 1 may perform optical character recognition (OCR), etc., on the input handwritten characters, and generate text data, etc.

Note that when the speaker determining unit 1F24 identifies who the speaker is among the participants, the speaker determining unit 1F24 may use a plurality of directional microphones, etc., to associate the direction in which the generation source of the voice sound is determined to be with the speaker, and identify the speaker among the participants. Alternatively, the speaker determining unit 1F24 may perform voice sound authentication on the input voice sound data, and identify the speaker based on the authentication result. Alternatively, the speaker determining unit 1F24 may capture an image of the speaker with a camera, etc., coupled to the network 12 (FIG. 1), and perform face authentication by using the captured image, to identify the speaker.

Furthermore, the inputting unit 1F1 may input information for identifying who has stated the statement content. Specifically, for example, first, speaker information items are assigned in advance to a plurality of function keys ("F1" through "F12") included in the keyboard. Then, when inputting the statement contents, a function key may be pressed to apply a speaker information item to the statement contents, by the conference support system 1. In this way, the statement contents and the speaker may be associated with each other.

Next, the conference support system 1 determines the type of the input statement, by the determining unit 1F21. Specifically, the type of statement (statement type) is, for example, "proposal", "question", "answer", "positive opinion", "negative opinion", "neutral opinion", "information", "request", "problem", "action item" (hereinafter also referred to as "A. I."), and "determination item", etc. In the following, a description is given of an example of classifying the statement contents into the statement types described above.

First, in the conference support system 1, expressions, which are defined for each statement type, are stored in the storage unit 1F3 in advance, for the purpose of determining the statement type. Furthermore, expressions are words, phrases, or terms, etc., and the statement type and an expression unique to the statement type are stored in association with each other in the storage unit 1F3. Then, when the statement content is input by the inputting unit 1F1, the determining unit 1F21 determines whether the statement content includes an expression stored in the storage unit 1F3. Next, when the statement content includes an expression stored in the storage unit 1F3, the determining unit 1F21 identifies the corresponding type from among the statement types. In this way, the conference support system 1 is able to determine the statement type of the statement content stated during a conference.

Furthermore, the outputting unit 1F4 outputs the conference contents. For example, the outputting unit 1F4 decorates and displays the statement content, based on the statement type determined by the determining unit 1F21.

(Input and Output Examples)

In the conference support system 1, for example, the terminals 11 display the following screens and perform processes.

Figure 4:
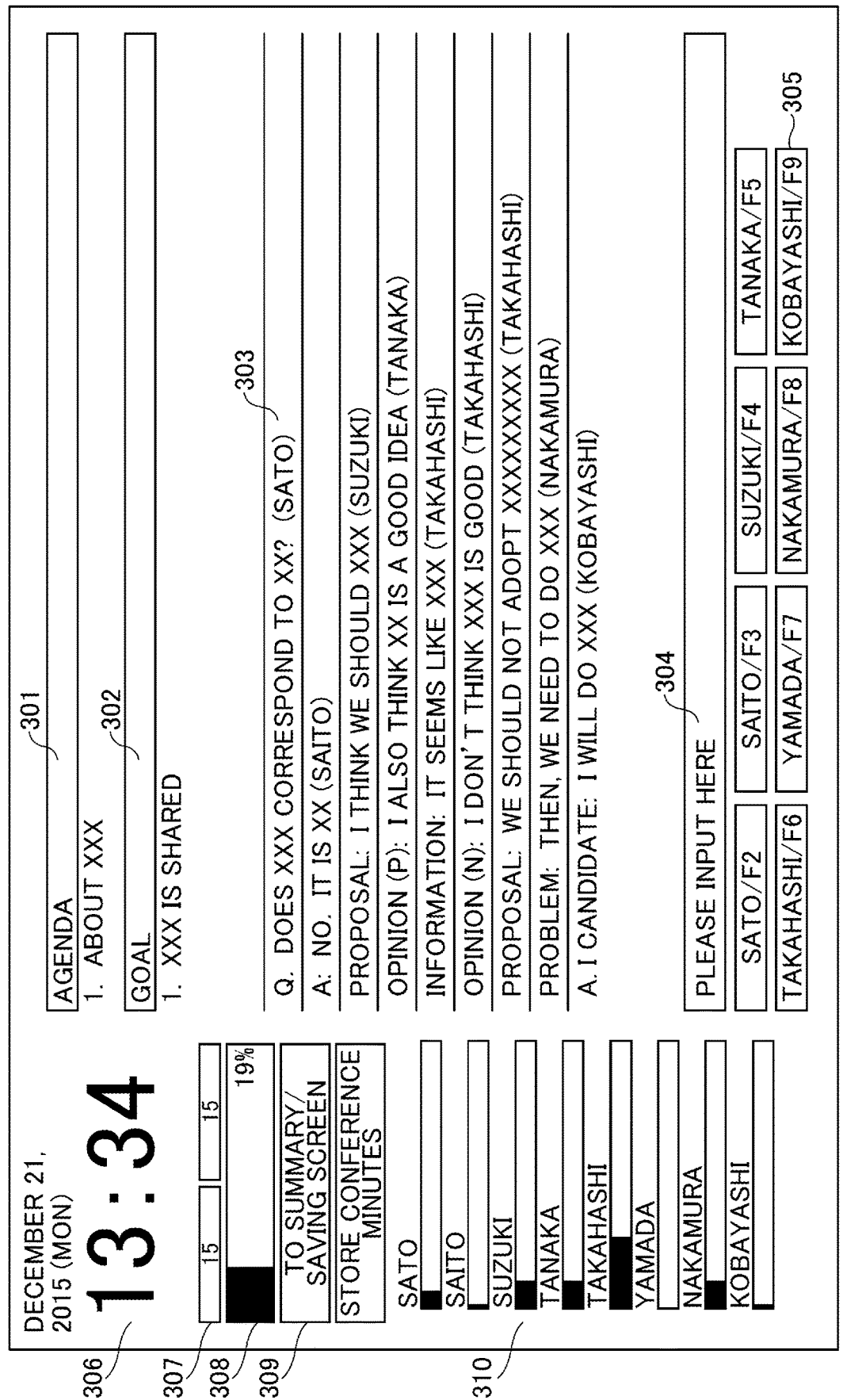
FIG. 4 illustrates an example of a screen displayed by the conference support system according to the first embodiment of the present invention.

FIG. 4 illustrates an example of a screen displayed by the conference support system 1 according to the first embodiment of the present invention. For example, a screen displayed on the display of each terminal has a display and a graphical user interface (GUI) as illustrated. In the following, a description is given by taking the illustrated screen as an example.

In this example, in the screen, an agenda 301 and the objective of the conference, i.e., a goal 302, are output by the outputting unit 1F4. Note that when the agenda 301 and the goal 302 are displayed during the conference, the participant's recognition and the vector of the discussion can be matched, etc. For this reason, the conference support system 1 is able to reduce deviations, etc., in the conference. Furthermore, the agenda 301 and the goal 302 are set in advance before the conference or at the beginning of the conference, as described below.

Figure 5:
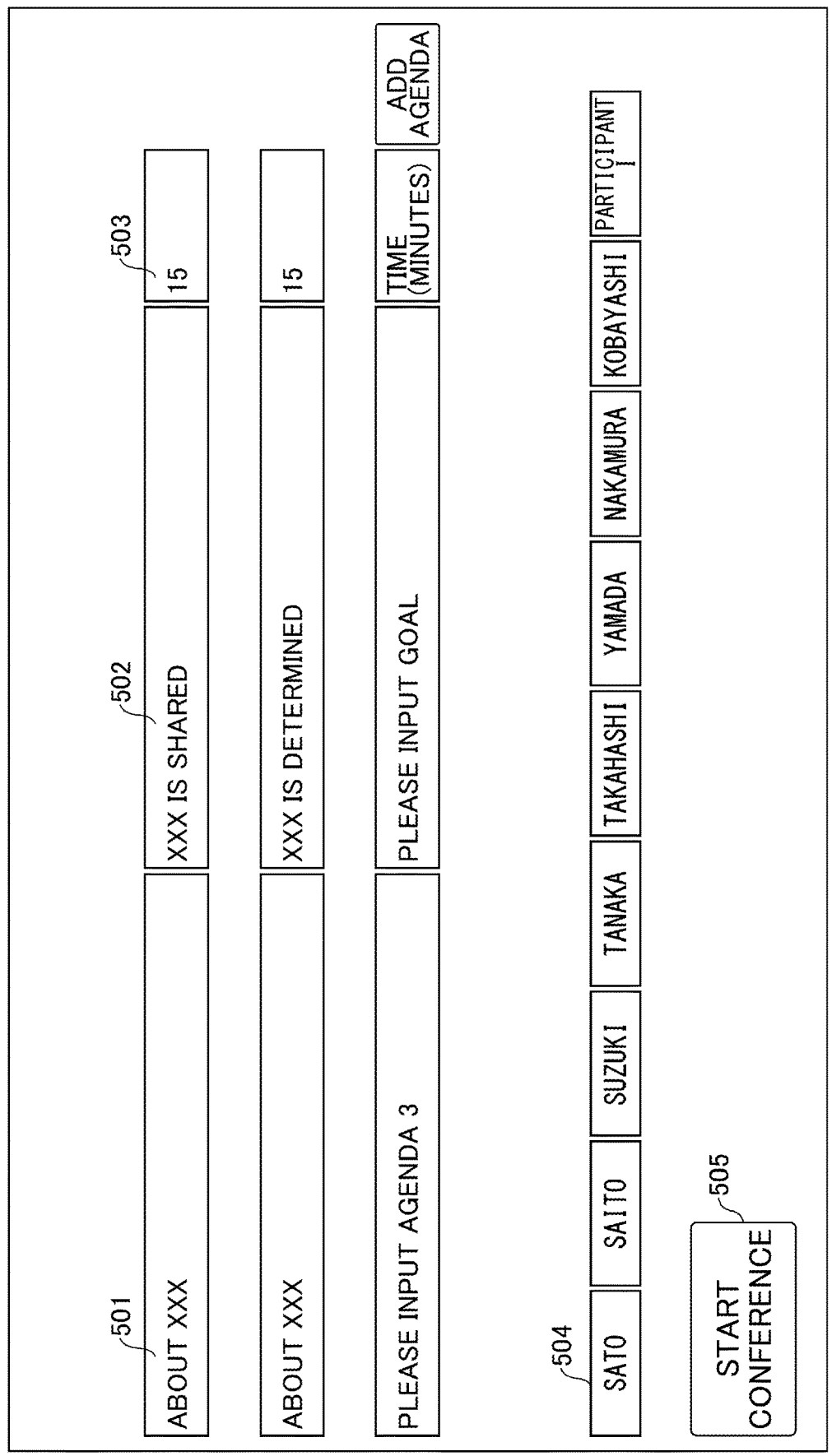
FIG. 5 illustrates an example of a setting screen for setting an agenda and a goal, etc., in the conference support system according to the first embodiment of the present invention.

FIG. 5 illustrates an example of a setting screen for setting the agenda and the goal, etc., in the conference support system 1 according to the first embodiment of the present invention. For example, the illustrated setting screen is displayed at the beginning of the conference, by the conference support system 1. Note that when the following settings are made in the setting screen, and a start button 505 is subsequently pressed, the settings are completed. That is, after the start button 505 is pressed, the screen illustrated in FIG. 4, etc., is displayed by the conference support system 1.

As illustrated, the participant inputs an agenda in an agenda setting text box 501. Then, the participant sets a goal for each agenda input in the agenda setting text box 501. Note that the goal is input in, for example, a goal setting text box 502. In this way, the agenda and the goal input in the agenda setting text box 501 and the goal setting text box 502 are displayed as the agenda 301 and the goal 302 as illustrated in FIG. 4, by the conference support system 1.

Furthermore, there are cases where an opening notice, etc., is created in advance, before the conference is held. In this case, the agenda and the goal described in the opening notice may be displayed as the agenda 301 and the goal 302 as illustrated in FIG. 4, by the conference support system 1. In this way, when an opening notice, etc., is reported to the participants of the conference in advance, the participants are able to make preparations beforehand, and therefore the efficiency of the conference is increased. Furthermore, when an opening notice, etc., is reported to the participants of the conference in advance, the participants can determine whether they are able to participate in the agenda, and therefore the participants can avoid participating in a conference that is unnecessary.

Referring back to FIG. 4, in the screen, a present time 306, a time allocation 307, and a progress status 308, etc., are displayed by the conference support system 1. Note that the present time 306 is displayed based on a time set in advance or data indicating a time acquired via a network, etc. Furthermore, the time allocation 307 is displayed based on the scheduled time for each agenda set in advance. For example, the scheduled time for each agenda is input in a scheduled time setting text box 503 illustrated in FIG. 5. Furthermore, the progress status 308 is displayed by a so-called progress bar, etc., which indicates the ratio of the elapsed time, etc., as illustrated, based on the time that has passed from the conference start time to the present time 306.

Furthermore, the following information may be displayed by the time managing unit 1F23 (FIG. 3) and the outputting unit 1F4 (FIG. 3). For example, when the scheduled end time of the entire conference or each agenda approaches, the remaining time may be displayed, or an alert prompting to wrap up the conference may be displayed. For example, in an example using the screen of FIG. 4, the conference support system 1 displays the following information.

FIG. 6 illustrates an example where an alert and the remaining time are displayed on a screen displayed by the conference support system 1 according to the first embodiment of the present invention. As illustrated, the conference support system 1 may display a remaining time 401 and an alert 402, etc. In the illustrated example, the displayed remaining time 401 indicates that the time from the present time until the scheduled end time of the entire conference is "less than or equal to 10 minutes". Furthermore, the displayed alert 402 indicates a message to the participant to wrap up the conference, such as coming to a conclusion of the conference, because the remaining time of the conference is decreasing. When such a message is displayed, the participant is able to secure enough time for wrapping up the discussion. Therefore, the conference support system 1 is able to reduce circumstances where the participants engage in a heated debate until there is no more time left, and the conclusion of the conference or the action item, etc., becomes vague.

Note that the alert and the remaining time are not limited to being output in the illustrated format. For example, the alert and the remaining time may be output by using a voice sound, etc.

Referring back to FIG. 4, a statement content 303 is displayed in the screen. Note that the statement content 303 is decorated based on the determination result by the determining unit 1F21 (FIG. 3). For example, as illustrated, to each statement content, information indicating the type of each statement is displayed and appended to the beginning or the end of each sentence. For example, the displayed and appended information indicating the statement type is "Q:", "A:", "proposal:", "opinion (P):", "opinion (N):", "information:", "agenda:", and "A. I. candidate". Note that any kind of decoration may be used as long as the type of each statement can be distinguished. For example, the decoration is made by applying different colors, using different typefaces such as italics and bold, etc., using different types of fonts, adding a character to the end of the sentence or to the beginning of the sentence, or a combination of these decorations. Note that the type of decoration may be set in advance in the conference support system 1. Specifically, for example, a statement content that is determined to be a "positive opinion" is displayed in blue letters, and "opinion (P)" is appended to the beginning of the sentence. Furthermore, a statement content determined to be a "negative opinion" or a "problem" is displayed in red letters, and "opinion (N)" and "problem" are appended to the beginning of the respective sentences. In this way, when the statement type is indicated by decorations, the participant is able to intuitively recognize the important point in the conference, the content of the discussion, and the tendency of the conference, etc. Note that the decoration may be processed by the server 10 (FIG. 1) or may be processed by a browser installed in the terminal 11 (FIG. 1).

Furthermore, when the speaker is identified, the speaker may be displayed by the conference support system 1 as illustrated. In the illustrated example, the name of the speaker is displayed in parenthesis. Note that the speaker may be displayed in a format other than the illustrated format. Furthermore, people who are candidate speakers, i.e., participants, are set in advance in a participant setting text box 504 in the setting screen of FIG. 5. Furthermore, as illustrated in FIG. 4, the participants set in the participant setting text box 504 are displayed as in a participant display 305 by the conference support system 1.

Note that in the illustrated example, a setting is made such that a function key is associated with each participant displayed in the participant display 305. For example, in the illustrated example, when one of the participants "Sato" makes a statement, and the function key "F2" is pressed when inputting the statement content stated by "Sato" in a statement content input text box 304, the input statement content and "Sato" that is the speaker information are associated with each other. That is, in the illustrated example, when the function key "F2" is pressed when inputting a statement content in the statement content input text box 304, the conference support system 1 displays the input statement content with "(Sato)" appended to the statement content.

Furthermore, for example, the statement type is determined by a process described below. In the following, a description is given of an example where the statement types are "question", "answer", "proposal", "problem", and "opinion".

Figure 7:
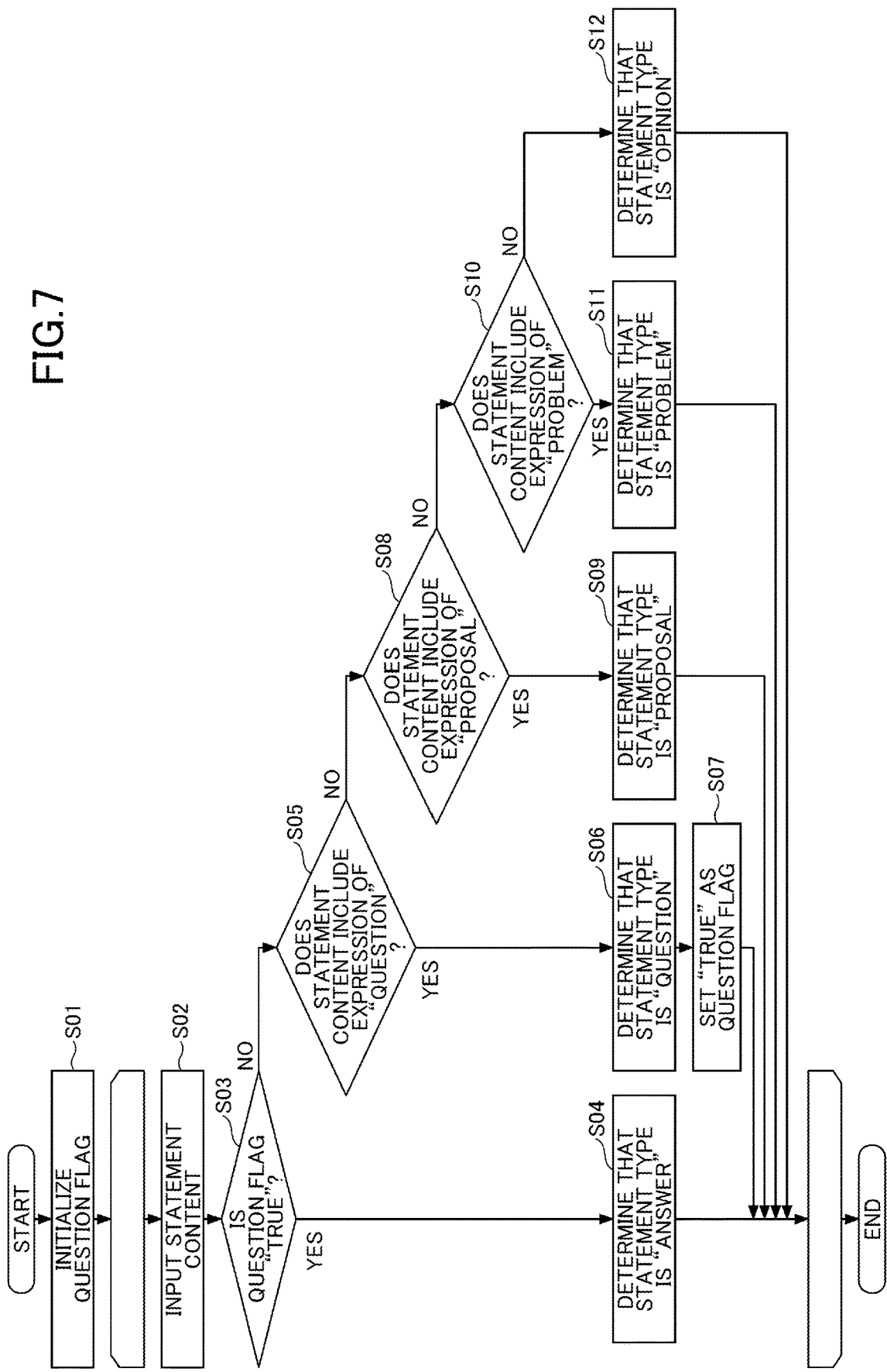
FIG. 7 is a flowchart illustrating an example of a process of determining the type of statement content by the conference support system according to the first embodiment of the present invention.

FIG. 7 is a flowchart illustrating an example of a process of determining the type of statement content by the conference support system 1 according to the first embodiment of the present invention.

In step S01, the conference support system 1 initializes a question flag. Specifically, the conference support system 1 sets "FALSE" in the question flag. Note that the question flag is an example of data indicating whether the statement type of the last statement content, which has just been input, is "question". In the following, when the question flag is "FALSE", the question flag indicates that the statement type of the last statement content is a statement type other than "question". On the other hand, when the question flag is "TRUE", the question flag indicates that the statement type of the last statement content is "question".

In step S02, the conference support system 1 inputs the statement content. Specifically, the conference support system 1 inputs the statement content by the inputting unit 1F1 (FIG. 3). That is, in the example illustrated in FIG. 4, the statement content is input in the statement content input text box 304 by text, etc.

In step S03, the conference support system 1 determines whether the question flag is "TRUE". When the question flag is "TRUE" (YES in step S03), next, the conference support system 1 proceeds to step S04. On the other hand, when the question flag is not "TRUE", that is, when the question flag is "FALSE" (NO in step S03), the conference support system 1 proceeds to step S05.

In step S04, the conference support system 1 determines that the statement type of the statement content is "answer". Note that "answer" is a statement content that is returned to a statement content corresponding to a statement type "question". Therefore, free expressions are allowed to be used in "answer". That is, there are cases where it is not possible to set expressions for determining that the statement type is "answer" in advance. Therefore, as in step S03, the conference support system 1 determines whether the last statement content is "question", that is, the conference support system 1 determines whether the statement type of the statement content is "answer", according to the question flag. That is, when the last statement content is "question", the conference support system 1 determines that the statement type of the next statement content is "answer". On the other hand, when the last statement content is other than "question", the conference support system 1 determines that the statement type of the next statement content is other than "answer". In this way, the conference support system 1 classifies the statement contents of "answer". Furthermore, in step S04, the conference support system 1 sets the question flag as "FALSE".

In step S05, the conference support system 1 determines whether the statement content includes expressions of "question". For example, the conference support system 1 determines the statement type of the statement content, according to the auxiliary verb part in the statement content. Specifically, first, expressions such as "?", "is it?", and "is it not?", etc., are stored in the storage unit 1F3 (FIG. 3) in advance. Next, the conference support system 1 determines, by the determining unit 1F21 (FIG. 3), whether all or part of the statement contents input by the inputting unit 1F1 (FIG. 3) match a stored expression. That is, the determination is made by so-called pattern matching, etc.

When the conference support system 1 determines that the statement content includes an expression of "question" in step S05 (YES in step S05), next, the conference support system 1 proceeds to step S06. On the other hand, when the conference support system 1 determines that the statement content does not include an expression of "question" in step S05 (NO in step S05), the conference support system 1 proceeds to step S08.

In step S06, the conference support system 1 determines that the statement type of the statement content is "question".

In step S07, the conference support system 1 sets "TRUE" in the question flag.

In step S08, the conference support system 1 determines whether the statement content includes expressions of "proposal". For example, similar to the case of "question", the conference support system 1 determines the statement type of the statement content, according to the auxiliary verb part in the statement content. Specifically, first, expressions such as "should be" and "preferable to do", etc., are stored in the storage unit 1F3 (FIG. 3) in advance. Next, the conference support system 1 determines, by the determining unit 1F21 (FIG. 3), whether all or part of the statement contents input by the inputting unit 1F1 (FIG. 3) match a stored expression.

When the conference support system 1 determines that the statement content includes an expression of "proposal" in step S08 (YES in step S08), next, the conference support system 1 proceeds to step S09. On the other hand, when the conference support system 1 determines that the statement content does not include an expression of "proposal" in step S08 (NO in step S08), the conference support system 1 proceeds to step S10.

In step S09, the conference support system 1 determines that the statement type of the statement content is "proposal".

In step S10, the conference support system 1 determines whether the statement content includes expressions of "problem". For example, similar to the case of "question", the conference support system 1 determines the statement type of the statement content, according to the auxiliary verb part in the statement content. Specifically, first, expressions such as "need to do" and "have to do", etc., are stored in the storage unit 1F3 (FIG. 3) in advance. Next, the conference support system 1 determines, by the determining unit 1F21 (FIG. 3), whether all or part of the statement contents input by the inputting unit 1F1 (FIG. 3) match a stored expression.

When the conference support system 1 determines that the statement content includes an expression of "problem" in step S10 (YES in step S10), next, the conference support system 1 proceeds to step S11. On the other hand, when the conference support system 1 determines that the statement content does not include an expression of "problem" in step S10 (NO in step S10), the conference support system 1 proceeds to step S12.

In step S11, the conference support system 1 determines that the statement type of the statement content is "problem".

In step S12, the conference support system 1 determines that the statement type of the statement content is "opinion".

As described above, steps S02 through S12 are repeatedly performed for each statement content. By performing such a process, the conference support system 1 is able to determine the statement type of the statement content.

Furthermore, the conference support system 1 may display an abstract. For example, when operations as described below are performed, the conference support system 1 switches between an abstract and the full text.

Figure 8:
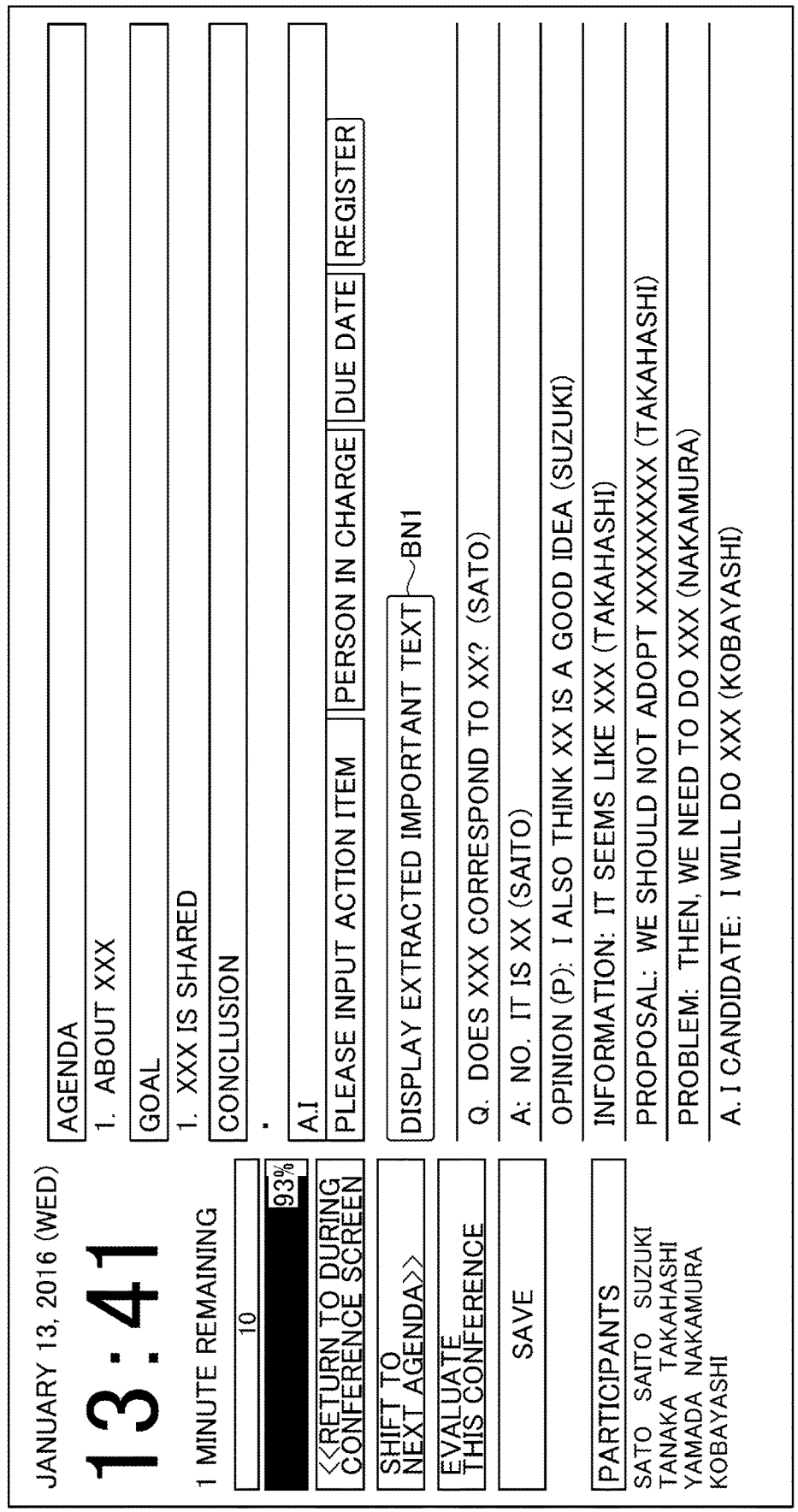
FIG. 8 illustrates an example of a screen for switching between an abstract and the full text by the conference support system according to the first embodiment of the present invention.

FIG. 8 illustrates an example of a screen for switching between an abstract and the full text by the conference support system 1 according to the first embodiment of the present invention. The illustrated screen is an example of a screen that is displayed during a conference. When a user presses an abstract instruction button BN1 in FIG. 8, on which a message reading "display extracted important text" is displayed, the conference support system 1 switches the screen to display the abstract.

Figure 9:
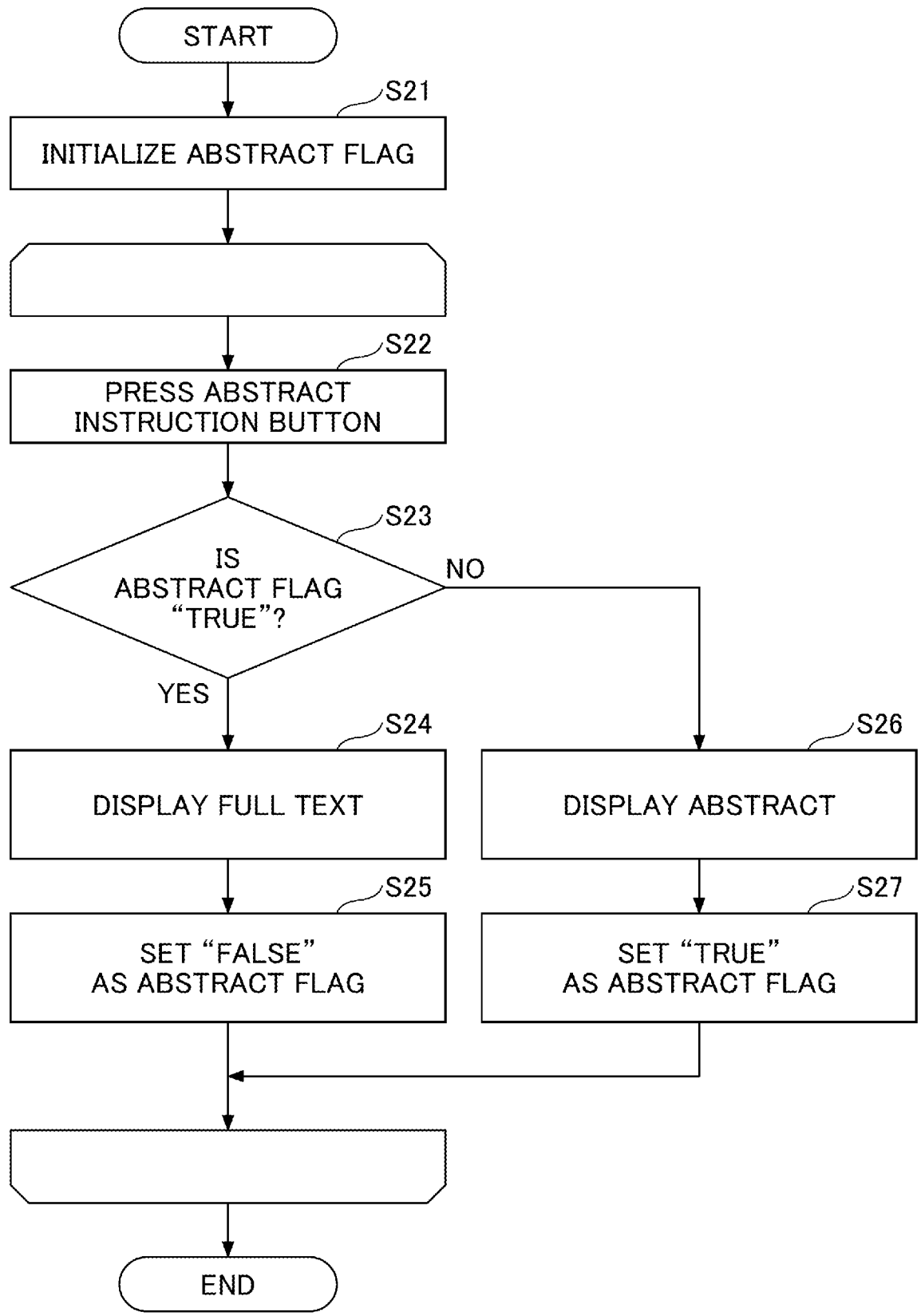
FIG. 9 is a flowchart illustrating an example of a process of switching between an abstract and the full text by the conference support system according to the first embodiment of the present invention.

FIG. 9 is a flowchart illustrating an example of a process of switching between an abstract and the full text by the conference support system 1 according to the first embodiment of the present invention. The conference support system 1 performs the illustrated process to generate an abstract. Note that in the following, the statement types are "proposal", "question", "answer", "positive opinion", "negative opinion", "neutral opinion", "information", "request", "problem", "action item", and "determination item", etc.

In step S21, the conference support system 1 initializes an abstract flag. Specifically, the conference support system 1 sets "FALSE" in the abstract flag. Note that the abstract flag is a flag for switching between displaying an abstract by extracting important parts of the input statement contents, and displaying the full text indicating the all of the statement contents. In the following, when the abstract flag is "FALSE", the conference support system 1 assumes that a setting is made to display the full text. On the other hand, when the abstract flag is "TRUE", the conference support system 1 assumes that a setting is made to display the abstract.

In step S22, the conference support system 1 accepts that the abstract instruction button BN1 (FIG. 8) is pressed. Every time this abstract instruction button BN1 is pressed, the screen display is switched between the full text and the abstract.

In step S23, the conference support system 1 determines whether the abstract flag is "TRUE". When the abstract flag is determined to be "TRUE" (YES in step S23), next, the conference support system 1 proceeds to step S24. On the other hand, when the abstract flag is not determined to be "TRUE", that is, when the abstract flag is determined to be "FALSE" (NO in step S23), the conference support system 1 proceeds to step S26.

In step S24, the conference support system 1 displays the full text. Specifically, for example, the conference support system 1 displays the screen illustrated in FIG. 8. That is, in the full text, the conference support system 1 displays all types of statement contents, among the input statement contents.

In step S25, the conference support system 1 sets the abstract flag as "FALSE".

In step S26, the conference support system 1 displays the abstract. Specifically, for example, a screen as described below is displayed by the conference support system 1.

Figure 10:
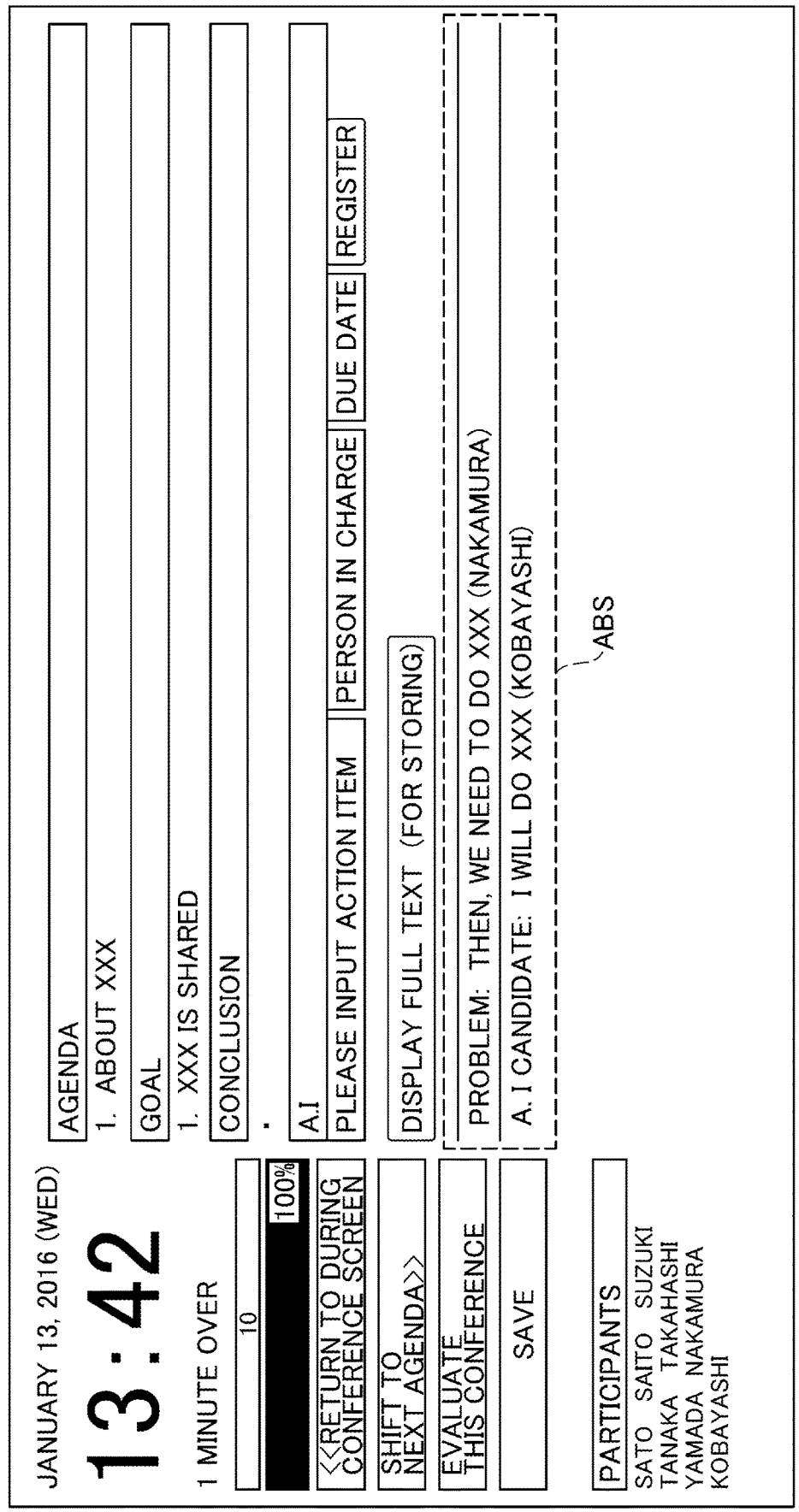
FIG. 10 illustrates an example of a screen indicating an abstract that is displayed by the conference support system according to the first embodiment of the present invention.

FIG. 10 illustrates an example of a screen indicating an abstract that is displayed by the conference support system 1 according to the first embodiment of the present invention. Compared to the screen of FIG. 8, the screen of FIG. 10 is different in that an abstract display ABS is displayed.

The abstract is a result obtained by extracting the important statement contents among the input statement contents. The conference support system 1 determines whether a statement content is an important statement content based on whether the type of the statement content is a statement type that has been set as important in advance. For example, the abstract is a result obtained by extracting the statement contents determined to be of the statement types "proposal", "problem", and "action item", among all of the types of statement contents that are input. That is, an abstract is a conference minutes generated as the conference support system 1 extracts the statement contents of predetermined statement types, from among the input statement contents. Note that in the illustrated example, the conference support system 1 has extracted statement contents determined to be of the statement types of "problem" and "action item", from the full text illustrated in FIG. 8, to generate an abstract. As illustrated, the conference support system 1 displays the statement contents of the target statement types, and hides the statement contents of the other statement types. That is, when the abstract illustrated in FIG. 10 is displayed, the participant can easily create an action item. In this way, when an abstract is displayed, the participant is able to review the points of the conference. Therefore, the conference support system 1 is able to let the participants organize the problem, the action item, or the determination item, without missing any of these important statements. In this way, the conference support system 1 can increase the efficiency of the conference.

Referring back to FIG. 9, in step S27, the conference support system 1 sets "TRUE" in the abstract flag.

As described above, steps S22 through S27 are repeatedly performed by the conference support system 1. By performing such a process, the conference support system 1 is able to switch the display between full text and an abstract.

Second Embodiment

A second embodiment is realized by, for example, the same overall configuration and hardware configuration as those of the first embodiment. Therefore, descriptions of the overall configuration and hardware configuration are omitted, and the different points are mainly described below. The functional configuration of the second embodiment is different from that of the first embodiment.

Figure 11:
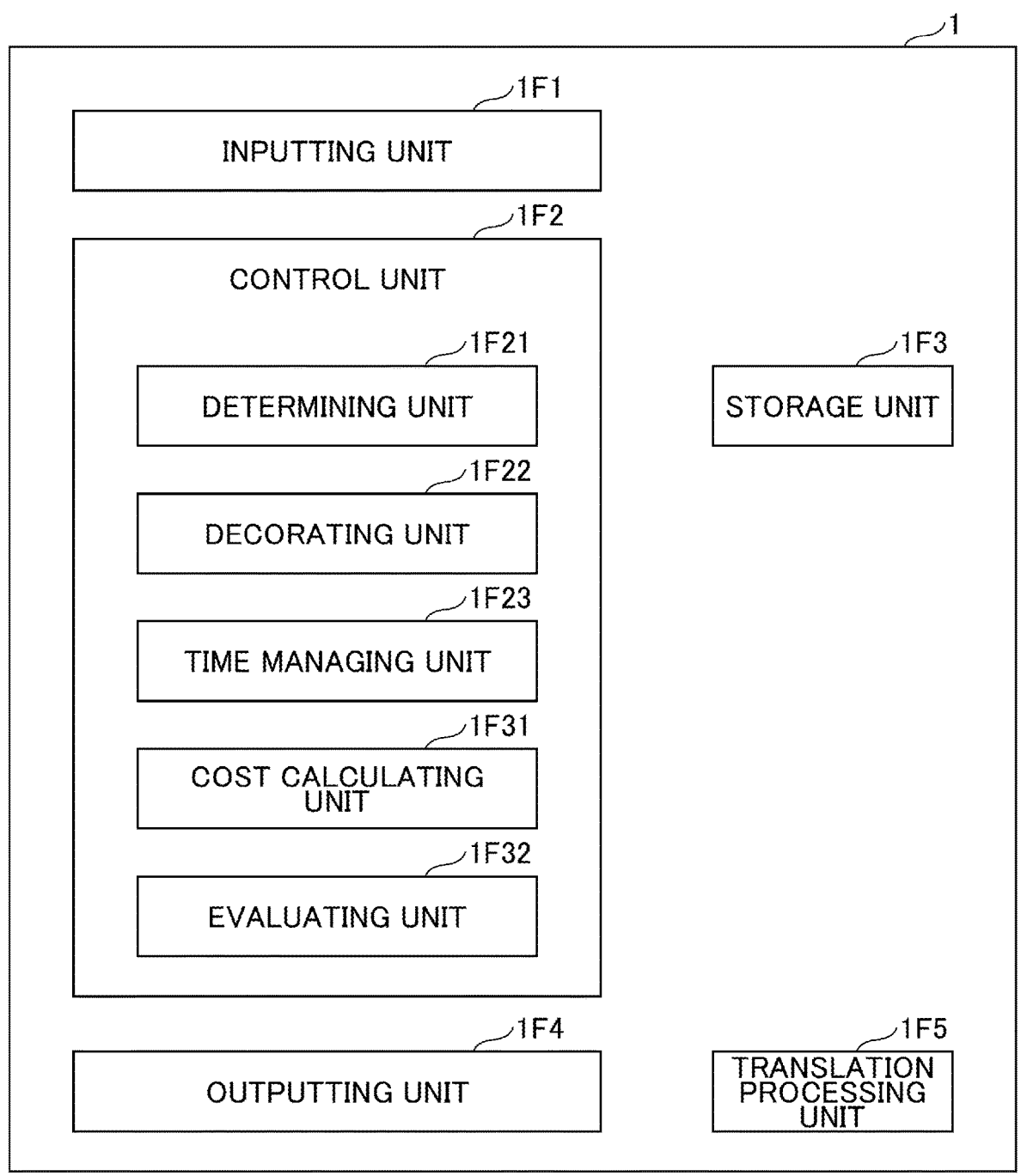
FIG. 11 is a functional block diagram of an example of the conference support system according to a second embodiment of the present invention.

FIG. 11 is a functional block diagram of an example of the conference support system 1 according to the second embodiment of the present invention. Compared to FIG. 3, the functional configuration of FIG. 11 is different in that the control unit 1F2 includes a cost calculating unit 1F31 and an evaluating unit 1F32.

Furthermore, as illustrated, the conference support system 1 preferably further includes a translation processing unit 1F5.

The cost calculating unit 1F31 calculates the cost that arises as a conference is held, based on the labor costs of the participants.

The evaluating unit 1F32 evaluates the conference, based on the time during which the conference is held, the number of statement contents, the statement types, and the ratio of the statement types, etc.

The calculation of the cost by the cost calculating unit 1F31 and the evaluation by the evaluating unit 1F32 are performed, for example, when a summary button 309 that is the "to summary/saving screen" button as illustrated in FIG. 4 is pressed, or when an alert 402 as illustrated in FIG. 6 is displayed, etc. For example, the conference support system 1 displays a summary screen as described below.

FIG. 12 illustrates an example of a summary screen displayed by the conference support system 1 according to the second embodiment of the present invention. In the illustrated example of the screen, the conference support system 1 displays, in an agenda display 801, an agenda set by the agenda setting text box 501 (FIG. 5), etc., in the opening notice or at the beginning of the conference. Furthermore, in the illustrated example of the screen, the conference support system 1 displays, in a goal display 802, a goal set by the goal setting text box 502 (FIG. 5), etc., in the opening notice or at the beginning of the conference.

Based on the contents displayed in the agenda display 801 and the goal display 802, a conclusion of the discussions is input to a conclusion input text box 803. Furthermore, based on the contents displayed in the agenda display 801 and the goal display 802, an action item that has been determined in the conference is input to an action item input text box 804. Note that with respect to the action item, a date, i.e., a deadline, etc., may be set. Also, a person in charge may be set with respect to the action item. Furthermore, in the action item input text box 804, a statement content, which is determined to be an "action item" by the conference support system 1, may be displayed as a candidate action item. Alternatively, a sentence obtained by performing a sentence compression process described below on a statement content determined to be an "action item", or a sentence obtained by organizing the expression of the end of the sentence determined to be an "action item" to create a simple expression, may be displayed as a candidate action item.

Furthermore, the conference support system 1 displays the calculation of the cost by the cost calculating unit 1F31 (FIG. 11) and the evaluation by the evaluating unit 1F32 (FIG. 11) in, for example, an evaluation screen as described below.

Figure 13:
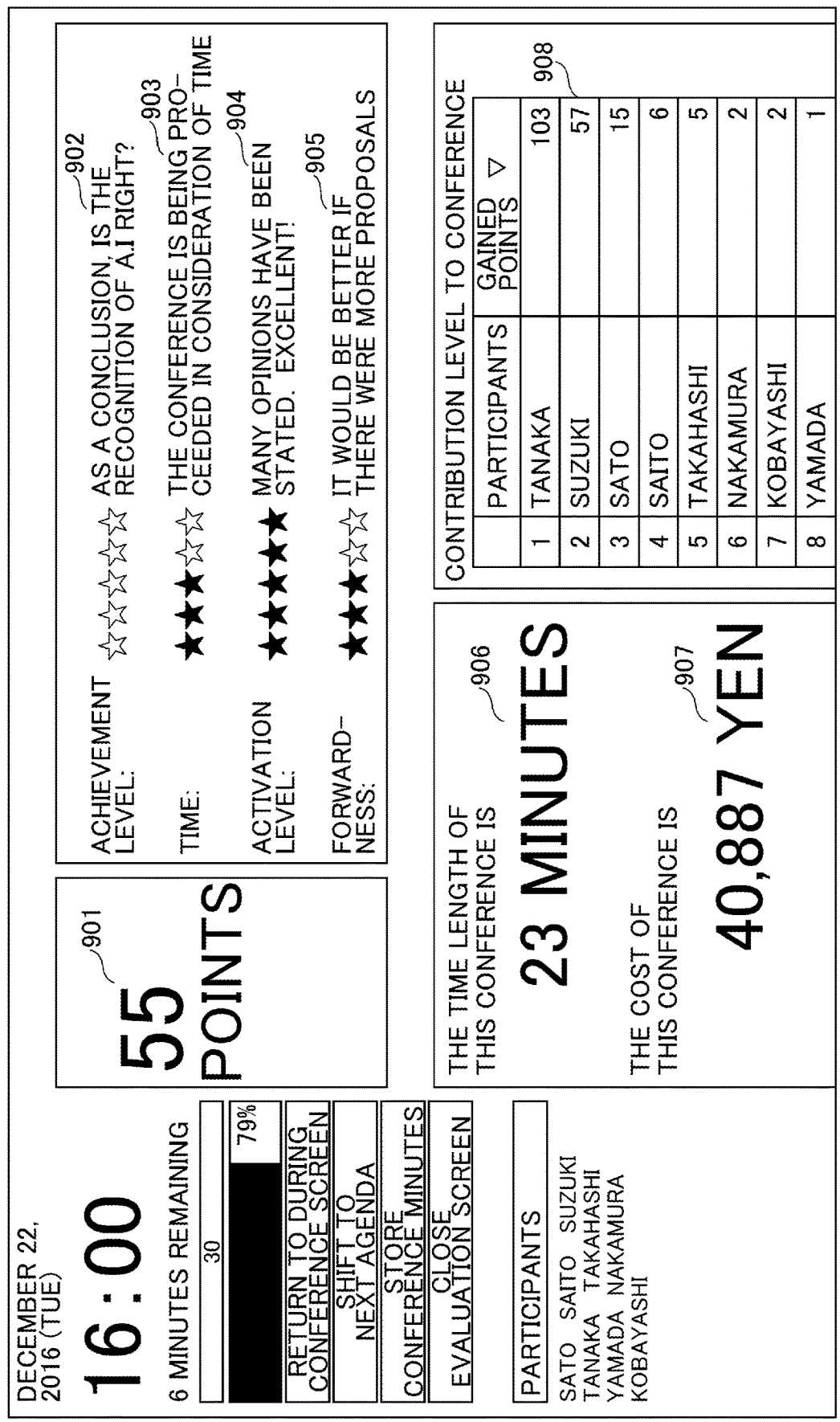
FIG. 13 illustrates an example of an evaluation screen displayed by the conference support system according to the second embodiment of the present invention.

FIG. 13 illustrates an example of an evaluation screen displayed by the conference support system 1 according to the second embodiment of the present invention. For example, the conference support system 1 displays the cost and evaluation result of a conference by points and amounts, etc., as illustrated.

Conference points 901 are the total points obtained by calculating the sum of achievement evaluation points 902, conference time evaluation points 903, activation level evaluation points 904, and forwardness evaluation points 905.

The achievement evaluation points 902 are an evaluation result indicating whether a conclusion has been input with respect to each goal that has been set in advance, with respect to each agenda set by the agenda setting text box 501 (FIG. 5). For example, when four agendas have been set by the agenda setting text box 501 (FIG. 5), and two conclusions have been input with respect to the four agendas, the conference support system 1 sets the achievement evaluation points 902 to be half the full points.

The conference time evaluation points 903 are an evaluation result obtained by comparing the scheduled time set by the opening notice or the scheduled time setting text box 503 (FIG. 5), and the time length of the conference. For example, when the time length of the conference is shorter than the scheduled time, the conference time evaluation points 903 become high. On the other hand, when the time length of the conference is longer than the scheduled time, the conference time evaluation points 903 become low.

The activation level evaluation points 904 are an evaluation result obtained by making an evaluation based on the number of statement contents or the number of statement contents per unit time, etc. For example, when the number of statement contents or the number of statement contents per unit time is large, the activation level evaluation points 904 become high. On the other hand, when the number of statement contents or the number of statement contents per unit time is small, the activation level evaluation points 904 become low. Therefore, when the activation level evaluation points 904 are low, there may be a possibility that the conference is unnecessary but the conference is being used as a place for sharing information, or people who are unrelated to the agenda are assembled and the people are doing side jobs during the conference. Therefore, the conference support system 1 feeds back these possibilities to prompt an improvement in the operations of conferences.

The forwardness evaluation points 905 are an evaluation result obtained by making an evaluation based on the statement types and the ratio of statement types determined by the determining unit 1F21 (FIG. 11). For example, when the ratio of statement contents of the statement type "proposal" is high, the forwardness evaluation points 905 become high. On the other hand, when the ratio of statement contents of the statement type "proposal" is low, the forwardness evaluation points 905 become low. Therefore, when the forwardness evaluation points 905 are low, there may be a possibility that there are many criticisms and comments, etc., in the conference, and a conclusion cannot be obtained. Therefore, the conference support system 1 may suggest this possibility to prompt the participants to give constructive opinions to attain a goal.

The conference support system 1 makes the above evaluations by the evaluating unit 1F32 (FIG. 11). Next, the conference support system 1 may output the evaluation results to a screen, etc., by the outputting unit 1F4 (FIG. 11), to feed back the objective evaluation results of the conference to the participants. In this way, by feeding back the evaluation results, the conference support system 1 is able to suggest to the participants where the problem may lie in the conference, etc., or make the participants to be aware of the time taken by the conference. Accordingly, the conference support system 1 is able to cause the participants to reconsider the members to participate in the conference or how to proceed with the conference.

Note that the evaluation results, the number of statement contents, and the statement types may be displayed by the conference support system 1 during the conference. For example, in the example illustrated in FIG. 4, the evaluation results, etc., may be displayed as in an evaluation display 310. That is, the evaluation results may be displayed in a real-time manner during the conference. In this way, for example, the conference support system 1 is able to prompt a participant who is not making many statements, to make more statements.

Furthermore, the conference support system 1 may weight the statement content that is determined to be a "problem" or a "proposal", etc., in the evaluation process. In this way, the conference support system 1 is able to prompt the participants to state many statement contents of the statement types "problem" and "proposal", etc. Thus, the conference support system 1 is able to promote more beneficial discussions.

Furthermore, in the evaluation screen, the conference support system 1 may display a calculation result of the cost, etc. For example, the cost calculating unit 1F31 (FIG. 11) calculates the cost based on a conference time 906 and the labor costs, etc., of the participants. The calculated cost is displayed, for example, as a cost display 907, etc.

In order to calculate the cost, first, in the conference support system 1, the labor cost per unit time of a participant is input. Note that the labor cost may be a uniformly fixed cost among all participants, or different labor costs may be set for the respective posts of the participants. Furthermore, the labor costs may be set based on the actual salaries, etc., of the participants.

Next, the conference support system 1 measures the elapsed time from the conference start time until the conference ends, and displays the measurement result in the conference time 906. Then, the conference support system 1 multiples the labor cost per unit time of each participant by the conference time 906, to calculate the cost of each participant. Next, the conference support system 1 obtains the total sum of the costs of the participants, and displays the calculation result in the cost display 907.

Furthermore, the conference support system 1 may display the evaluation result of each participant in the evaluation screen. For example, the evaluation result of each participant is displayed as a contribution level display 908, etc.

For example, the contribution level display 908 indicates the evaluation result of each participant, based on the statement type and the number of statement contents, etc., determined by the determining unit 1F21 (FIG. 11). Note that the statement content is associated with the participant that has stated the statement content, by the speaker determining unit 1F24 illustrated in FIG. 3.

For example, the contribution level display 908 is calculated by the conference support system 1 as described below. First, the participant sets a weight to a statement type that is considered to be important in line with the objective of the conference, such as "1 point" for "neutral opinion", and "5 points" for "problem" and "proposal". Note that in the conference support system 1, a high weight is preferably set for constructive opinions such as "problem" and "proposal". By setting the weight as above, the conference support system 1 is able to promote beneficial discussions toward problem-solving.

Next, the conference support system 1 makes an evaluation for each participant, according to the product of the determination result by the determining unit 1F21 and the number of statement contents. The value calculated by this evaluation is the "contribution level" and the "gained points" indicated in the contribution level display 908. In this way, when the conference support system 1 feeds back the "contribution level", etc., to the participants, the participants are able use the "contribution level", etc., to revise the members to participate in the conference. Thus, the conference support system 1 is able to promote more beneficial discussions. Furthermore, it is possible to reduce the number of unnecessary members among the participants, and therefore the conference support system 1 is able to reduce the cost of the conference.

Note that the screens indicated above may be shared in a real-time manner among the terminals 11 coupled to the network 12 illustrated in FIG. 1. Accordingly, even when a conference is held at a location without a display, if the participants bring along the terminals 11 such as notebook PCs, the participants can look at the above screens while holding the conference.

Furthermore, the statement contents, etc., may be edited in a shared manner from the respective terminals 11. For example, the server 10 may convert the contents, etc., displayed on the screen into a Hyper Text Markup Language (HTML) file, etc., and send the HTML file to the respective terminals 11. Next, when the statement contents, etc., are input, and data indicating the statement contents, etc., is sent to the server 10, the server 10 sends a HTML file in which the new statement contents, etc., are applied, to the respective terminals 11.

Furthermore, for the purpose of sharing a screen in a real-time manner, for example, a protocol for bidirectional communication such as WebSocket is used. WebSocket is a protocol disclosed in "https://ja.wikipedia.org/wiki/WebSocket", etc.

Note that a translation process may be performed on the words displayed in the screen. For example, when a statement content, etc., is input, and data indicating the statement content, etc., is sent to the server 10, the server 10 translates the statement content, and generates a HTML file indicating the statement content before translation and the statement content after translation. Next, the server 10 sends the HTML file indicating the statement content before translation and the statement content after translation, to the respective terminals 11. Accordingly, even if the participants speak different languages, the conference support system 1 can reduce miscommunications.

The translation process is implemented by the translation processing unit 1F5 (FIG. 11). For example, the translation processing unit 1F5 has a functional configuration including a translating unit, a translation language setting unit, and a translation result storage processing unit, etc., as described below. Specifically, the translation process is realized by a method disclosed in Japanese Unexamined Patent Application Publication No. 2015-153408, etc. Note that the translation processing unit 1F5 is realized by, for example, the CPU 10H1 (FIG. 2), etc.

First, the translation language setting unit sets the language spoken by the participant (hereinafter referred to as "input language") and the language after translating the input language (hereinafter referred to as "translated language"), based on the user's operations.

Then, the translating unit refers to a language model and a word dictionary to perform a part of speech decomposing process and sentence structure analysis on the statement contents input in the input language. In this way, the translating unit translates the statement contents input in the input language, into the translated language.

Next, the translation result storage processing unit stores the characters, etc., in the translated language generated according to the translation performed by the translating unit, as a text file, etc. Then, the conference support system 1 may output the characters, etc., in the translated language stored in the translation result storage processing unit.

Furthermore, the respective terminals 11 may perform user authentication. For example, user authentication is performed by inputting a user name in an input text box for inputting a user name, displayed on the screen. Alternatively, user authentication may be performed by using an integrated circuit (IC) card or a radio-frequency identification device (RFID), etc. Accordingly, similar to the allocation of function keys in FIG. 4, the speaker and the statement content may be associated with each other based on the authentication result of user authentication described above, and the terminal in which the statement content has been input. Note that the information relevant to the speaker may be decorated by being colored, or having information appended to the beginning or the end of each sentence, similar to the first embodiment.

Furthermore, a subjective evaluation may be input with respect to the statement content, and the conference support system 1 may make an evaluation based on the input subjective evaluation. For example, a subjective evaluation is input as follows.

FIG. 14 illustrates an example of a screen for inputting a subjective evaluation displayed by the conference support system 1 according to the second embodiment of the present invention. Compared to FIG. 6, the example of the screen illustrated in FIG. 14 is different in that a subjective evaluation button 1001 is added to each of the displayed statement contents.

As illustrated, the subjective evaluation button 1001 is displayed for each statement content. Then, when each participant determines that the participant himself supports the statement content, the participant presses the subjective evaluation button 1001 displayed for the statement content that the participant supports. Note that the subjective evaluation button 1001 may be pressed by the participant who is in charge of inputting information, or may be pressed by the respective participants based on their own determinations. Furthermore, the subjective evaluation button 1001 may be pressed when a participant does not support the statement content. In this way, when the subjective evaluation is input, the conference support system 1 is able to evaluate whether each statement content is a good statement, based on the subjective evaluations of the participants. Then, the conference support system 1 can display the evaluation result based on the subjective evaluations, and prompt the participants to make good statements to achieve the objective of the conference.

Furthermore, the conference support system 1 may decorate and display the statement contents, based on input according to the subjective evaluation button 1001. For example, in the illustrated screen, the conference conference support system 1 displays the statement content for which the subjective evaluation button 1001 has been pressed, as an enlarged display 1002. As illustrated, in the enlarged display 1002, the statement content is decorated such that the font size of the characters indicating the statement content is larger than those of the other statement contents. In this way, when the statement content is decorated and output, the participant can intuitively recognize the statement content that is supported, among the statement contents. Furthermore, the conference support system 1 may display the status of pros and cons with respect to a statement content, such as who is agreeing with a particular opinion and who is disagreeing with the particular opinion, by using user information.

Note that decorations are realized, for example, by changing the description of Cascading Style Sheets (CSS) by using a language such as JavaScript (registered trademark), using the information indicating support or non-support.

Furthermore, when displaying an abstract, the conference support system 1 may display a statement content that is determined to be an important statement based on the input subjective evaluations, in addition to displaying the statement contents based on the statement types. Accordingly, the participant can further understand the development of the discussion until a conclusion is achieved. That is, accordingly, the conference support system 1 is able to generate effective conference minutes for reviewing the conference and sharing information.

Furthermore, the evaluating unit 1F32 (FIG. 11) may evaluate the conference based on the time length of the conference. For example, the evaluating unit 1F32 (FIG. 11) makes an evaluation as follows.

Figure 15:
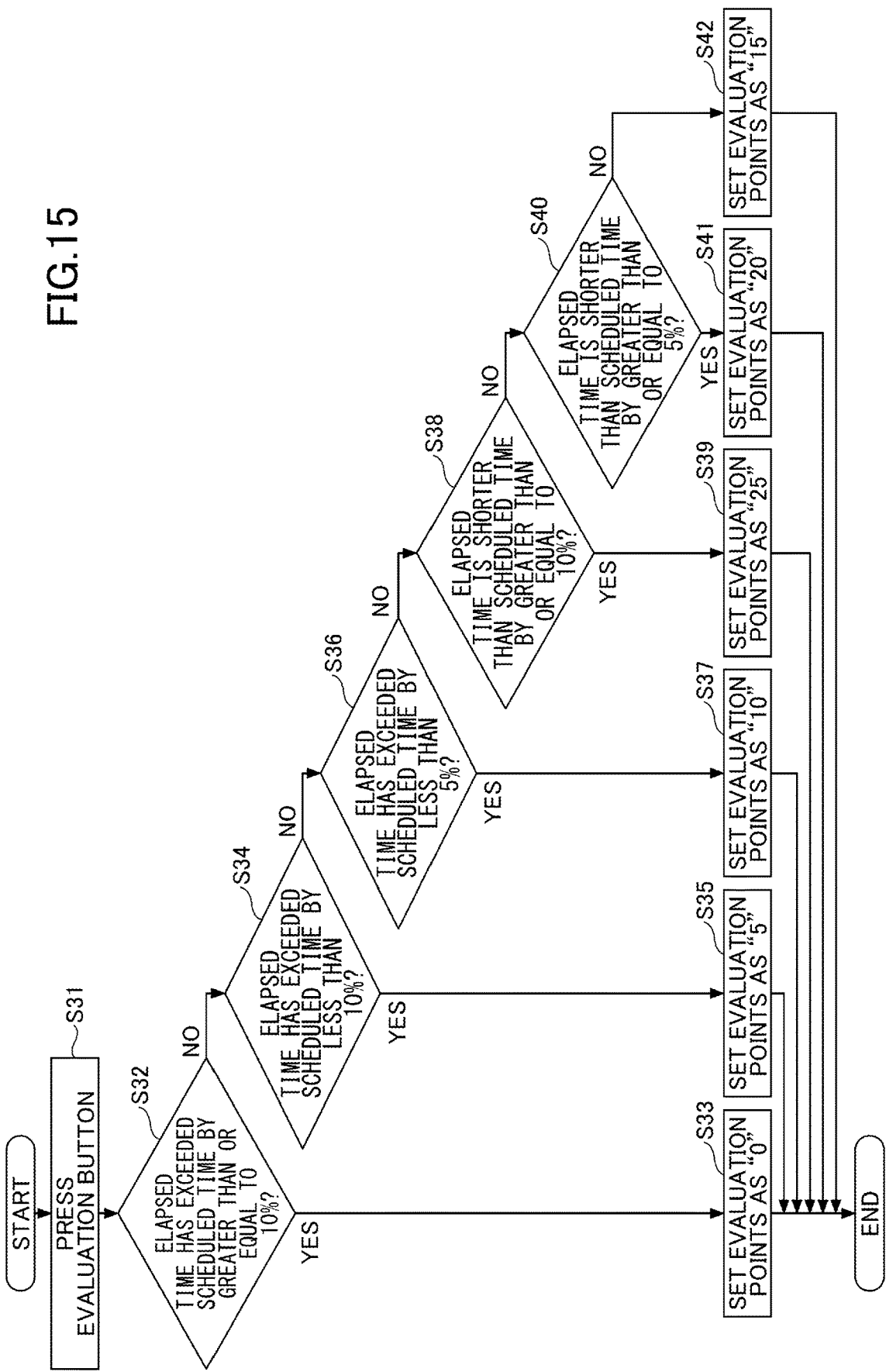
FIG. 15 is a flowchart of an example of a process of making an evaluation based on the time length of the conference, performed by the conference support system according to the second embodiment of the present invention.

FIG. 15 is a flowchart of an example of a process of making an evaluation based on the time length of the conference, performed by the conference support system 1 according to the second embodiment of the present invention.

In step S31, the conference support system 1 accepts that an evaluation button has been pressed. For example, when an evaluation button saying "evaluate this conference" of FIG. 10 is pressed, the conference support system 1 starts the evaluation. Furthermore, it is assumed that the time during which a conference is held is the time from when the conference has started to when the conference has ended (hereinafter referred to as "elapsed time"). Furthermore, it is assumed that the scheduled time length of the conference (hereinafter, simply referred to as "scheduled time") is assumed to be input in the conference support system 1 in advance, such as before the evaluation button is pressed.

In step S32, the conference support system 1 determines whether the elapsed time has exceeded the scheduled time by greater than or equal to 10%. When the conference support system 1 determines that the elapsed time has exceeded the scheduled time by greater than or equal to 10% (YES in step S32), the conference support system 1 proceeds to step S33. On the other hand, when the conference support system 1 determines that the elapsed time has not exceeded the scheduled time by greater than or equal to 10% (NO in step S32), the conference support system 1 proceeds to step S34.

In step S33, the conference support system 1 sets the evaluation points as "0" points.

In step S34, the conference support system 1 determines whether the elapsed time has exceeded the scheduled time by less than 10%. When the conference support system 1 determines that the elapsed time has exceeded the scheduled time by less than 10% (YES in step S34), next, the conference support system 1 proceeds to step S35. On the other hand, when the conference support system 1 determines that the elapsed time has not exceeded the scheduled time by less than 10% (NO in step S34), next, the conference support system 1 proceeds to step S36.

In step S35, the conference support system 1 sets the evaluation points as "5" points.

In step S36, the conference support system 1 determines whether the elapsed time has exceeded the scheduled time by less than 5%. When the conference support system 1 determines that the elapsed time has exceeded the scheduled time by less than 5% (YES in step S36), next, the conference support system 1 proceeds to step S37. On the other hand, when the conference support system 1 determines that the elapsed time has not exceeded the scheduled time by less than 5% (NO in step S36), next, the conference support system 1 proceeds to step S38.

In step S37, the conference support system 1 sets the evaluation points as "10" points.

In step S38, the conference support system 1 determines whether the elapsed time is shorter than the scheduled time by greater than or equal to 10%. When the conference support system 1 determines that the elapsed time is shorter than the scheduled time by greater than or equal to 10% (YES in step S38), next, the conference support system 1 proceeds to step S39. On the other hand, when the conference support system 1 determines that the elapsed time is not shorter than the scheduled time by greater than or equal to 10% (NO in step S38), next, the conference support system 1 proceeds to step S40.

In step S39, the conference support system 1 sets the evaluation points as "25" points.

In step S40, the conference support system 1 determines whether the elapsed time is shorter than the scheduled time by greater than or equal to 5%. When the conference support system 1 determines that the elapsed time is shorter than the scheduled time by greater than or equal to 5% (YES in step S40), next, the conference support system 1 proceeds to step S41. On the other hand, when the conference support system 1 determines that the elapsed time is not shorter than the scheduled time by greater than or equal to 5% (NO in step S40), next, the conference support system 1 proceeds to step S42.

In step S41, the conference support system 1 sets the evaluation points as "20" points.

In step S42, the conference support system 1 sets the evaluation points as "15" points.

For example, as illustrated, the conference support system 1 makes an evaluation to give high evaluation points in a case where the elapsed time is shorter than the scheduled time. On the other hand, the conference support system 1 makes an evaluation to give low evaluation points in a case where the elapsed time has exceeded the scheduled time. Note that the values of evaluation points and the determination standards are not limited to the illustrated values and determinations, and may be changed by settings, etc. As illustrated, the conference support system 1 displays the evaluated evaluation points.

Furthermore, as illustrated in FIG. 13, the conference support system 1 may display the evaluation results with star marks, etc., as illustrated in FIG. 13. Furthermore, the conference support system 1 may also display a comment prompting to transform actions, as illustrated in FIG. 13. Furthermore, the conference support system 1 may also display an evaluation result relevant to the time, together with the other evaluation results, as illustrated in FIG. 13. In this way, when an evaluation result, result, which is obtained by evaluating the conference based on the time length of the conference, is displayed, the conference support system 1 is able to make the participants be aware of the time relevant to the conference, and prompt the participants to achieve the objective within the scheduled time. In this way, the conference support system 1 is able to increase the efficiency of the conference.

Third Embodiment

A third embodiment is realized by, for example, the same overall configuration, hardware configuration, and functional configuration as those of the first embodiment. In the following, the different points are mainly described. The determination method by the determining unit 1F21 (FIG. 3) of the third embodiment is different from that of the first embodiment.

In the third embodiment, the conference support system 1 sets a corpus with tags as training data. Then, the conference support system 1 performs so-called supervised learning, etc., which is a method of machine learning, to learn a classifier for performing a natural language process. In the following, a description is given of an example where the tags, i.e., the statement types, are "proposal", "question", "answer", "positive opinion", "negative opinion", "neutral opinion", "information", "request", "problem", "action item", and "determination item", etc.

Furthermore, the method of machine learning is, for example, support vector machine (SVM), Naive Bayes classifier, decision tree learning, or Conditional Random Fields (CRF). Note that the method of machine learning is preferably support vector machine. In the case of support vector machine, determinations can be sequentially made, and therefore the so-called real-time properties are improved.

A classifier determines the statement type based on the characteristic (hereinafter referred to as "feature") of the statement content. Specifically, the features are an adverb, an adjective, a noun, or an auxiliary verb included in the statement contents. For example, an adjective may indicate a positive expression or a negative expression. Furthermore, a noun may be an expression indicating an "action item" and a "problem" such as "to be reviewed" and "to reply", in addition to a position expression or a negative expression. Furthermore, an auxiliary verb may be an expression indicating wish, obligation, necessity, request, proposal, predication, supposition, hearsay, and evaluation, at the end of a sentence. Therefore, when the classifier determines the statement type based on the feature, the conference support system 1 can determine the statement type with high precision.

Furthermore, the conference support system 1 may be able to set the type of conference according to the users. For example, the same statement content may have different features, depending on whether the conference is held between staff members in the field, or whether the conference is a review conference. Specifically, in a conference held between staff members in the field, the feature of the statement content is "demand". On the other hand, in a review conference, the feature of the statement given by a decision maker may be "action item" or "determination item". These labels and the type of conference are highly related. Therefore, by setting the type of conference, the conference support system 1 is able to determine the statement type with high precision.

Furthermore, the conference support system 1 may estimate the role of the speaker based on the statement content, and use the role as the feature. For example, in a review conference or a debrief session, etc., a speaker, who states many statement contents that are "questions" with respect to statement contents of the report content, is estimated to be a decision maker. Also, a speaker, who states many statement contents that are "problems", is estimated to be an expert with respect to the topic of the conference.

By using results obtained by the above estimations as features, in the learning and the determining of a classifier, the conference support system 1 can determine the statement type with high precision, even without setting the decision maker, etc., in the conference support system 1.

For example, the conference support system 1 performs a natural language process using machine learning, by a method described in "The basics of natural language process", written by Manabu Okumura and published by Corona Publishing, Co., Ltd.

Figure 16:
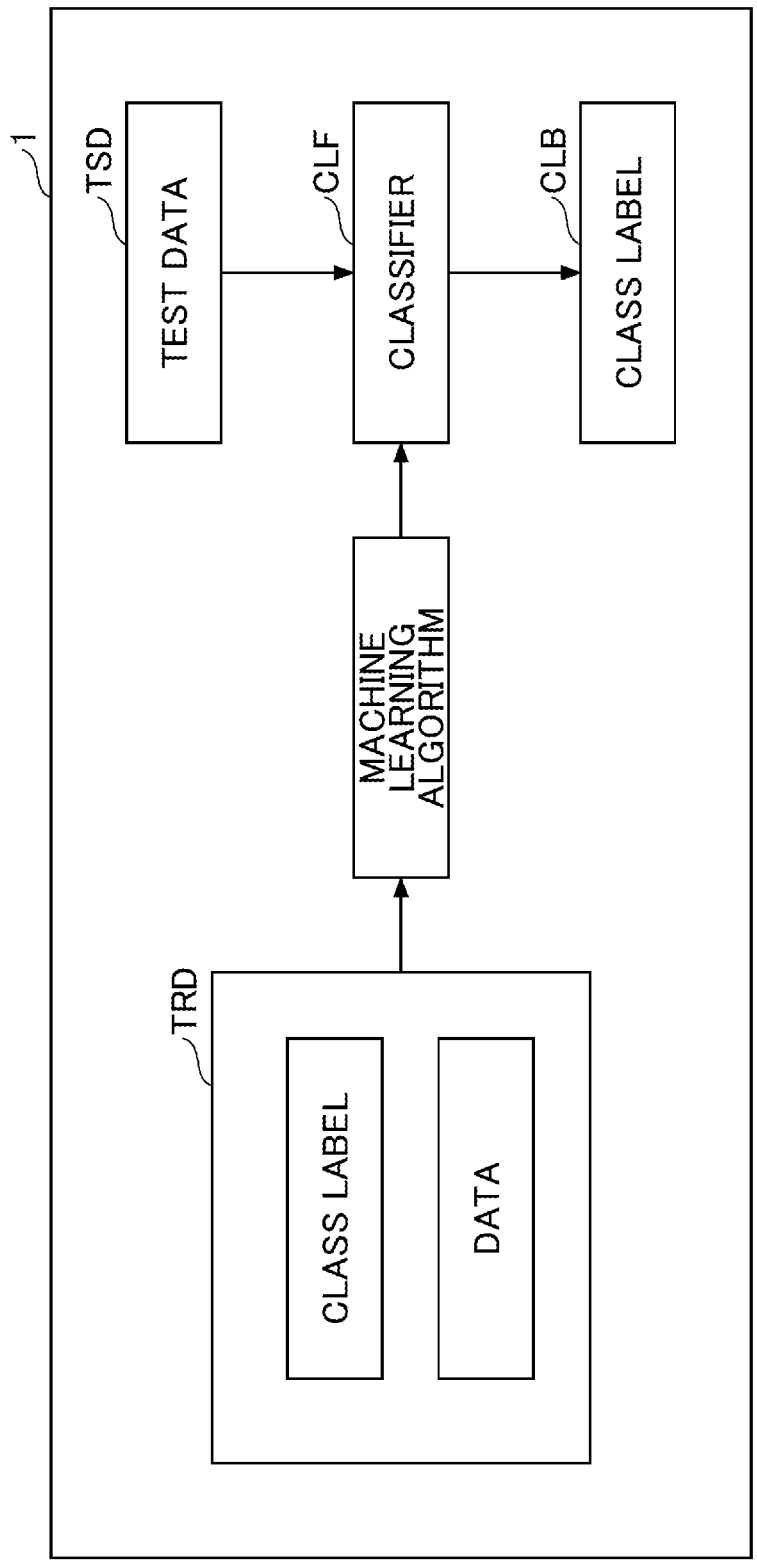
FIG. 16 is a conceptual diagram illustrating an example of a natural language process using machine learning by the conference support system according to a third embodiment of the present invention.

FIG. 16 is a conceptual diagram illustrating an example of a natural language process using machine learning by the conference support system 1 according to the third embodiment of the present invention. As illustrated, the conference support system 1 learns a classifier CLF by supervised learning. First, data expressing an assembly of pairs of features and values, is input in the classifier CLF, and the classifier CLF outputs the class to which the input test data TSD belongs. A class is indicated by a class label CLB. That is, a class label CLB indicates the result of determining the statement type of the statement content indicated by the test data TSD.

In order to learn the classifier CLF by a machine learning algorithm, as illustrated, the conference support system 1 inputs an assembly of pairs of data and a class to which the data belongs, as training data TRD. Next, when the training data TRD is input, the conference support system 1 learns the classifier CLF by the machine learning algorithm. In this way, after learning the classifier CLF, when the test data TSD is input, the conference support system 1 is able to output the class to which the test data TSD belongs, by the classifier CLF. According to the above configuration, by inputting information of words around the words of the statement content that is the determination target, the conference support system 1 is able to learn the classifier that can output the meanings of the words.

By the method of determining the statement type by using the classifier CLF, the conference support system 1 is able to determine the statement type with higher precision, compared to the method of using pattern matching, etc. Furthermore, by the method of determining the statement type by using the classifier CLF, the labor hours taken for updating the data can be reduced, compared to the method of using pattern matching, etc. That is, when the method of determining the statement type by using the classifier CLF is used, the so-called maintenance properties can be improved.

Furthermore, the participant may be able to change the class labels. In this way, when the class label CLB, which is obtained as a result of determination by the classifier CLF, indicates a different class from the class intended by the participant, the participant can change the class. For example, when the conference support system 1 determines a statement content stated by a participant to be an "opinion", but the participant thinks his statement is a "question", the participant performs an operation of chaining the class label from "opinion" to "question".

As described above, by performing the operation of changing the class label and feeding back the change, the conference support system 1 is able to learn the classifier CLF, in the same way as a case where the training data TRD is input in machine learning. Therefore, the conference support system 1 can learn the classifier CLF with less labor hours taken for updating the data. Thus, the conference support system 1 is able to determine the statement type with high precision.

In another example, the conference support system 1 may determine the statement type based on the person who has stated the statement content. For example, in a conference, it is assumed that there is a person who is always stating many "problems" and a person who is always stating many "negative opinions". In this case, the conference support system 1 may identify the person who has stated the statement content, to determine the statement type of "problem" and "negative opinion", etc. Furthermore, the conference support system 1 may use the information of the identified person who has stated the statement content, as the feature. In this way, the conference support system 1 is able to determine the statement type in consideration of the tendency of the person stating the the statement content. Therefore, the conference support system 1 is able to determine the statement type with high precision.

Furthermore, the conference support system 1 may determine the statement type based on the role of the person who has stated the statement content, in the conference. For example, in a conference that is a debrief session, etc., the conference support system 1 may determine the statement type based on the fact that the statement content is stated by a "decision maker", when the person who has stated the statement content is a "decision maker". In this way, the conference support system 1 is able to determine the statement type in consideration of the tendency of the person who has stated the statement content. Therefore, the conference support system 1 is able to determine the statement type with high precision. Particularly, the conference support system 1 is able to determine the statement types of "action item" and "determination item", etc., with high precision.

Furthermore, when there are many statement types, i.e., labels, the precision in determination may decrease. Therefore, the conference support system 1 may divide the statement types into groups. A description is given of an example where the statement types are "proposal", "question", "answer", "positive opinion", "negative opinion", "neutral opinion", "information", "request", "problem", "action item", and "determination item".

For example, the statement types are divided into a "first group" and a "second group" as described below.

First group: "proposal", "question", "answer", "positive opinion", "negative opinion", "neutral opinion", "information", and "request"

Second group: "action item", and "determination item"

Then, the conference support system 1 determines the statement type of the statement content, among the statement types in the "first group". Next, the conference support system 1 determines the statement type of the statement content, among the statement types in the "second group". In the configuration of FIG. 16, a classifier CLF is prepared for each group.

For example, it is assumed that a participant has stated a statement content of "please somehow handle this case among a plurality of staff members". The conference support system 1 determines that the statement type of this statement content is "answer" in the first group, and also "action item" in the second group.

For example, it is assumed that statement contents of the statement types "action item" and "determination item" are important in the conference. In this case, when the important statement types are selected and grouped together as in the second group described above, the conference support system 1 is able to determine the statement contents of the important statement types with high precision. Furthermore, the number of the statement types in each group is less than that of a case where the statement types are not grouped, and therefore the conference support system 1 is able to determine the statement types with high precision.

Furthermore, the conference support system 1 may display candidate conclusions or candidate determination items with respect to the statement contents. For example, the conference support system 1 displays statement contents to be candidate conclusions or candidate determination items as "conclusion", "determination item", or "problem", etc., in the action item input text box 804 in FIG. 12.

Furthermore, the conference support system 1 may display an icon, etc., of a trash box beside the action item input text box 804. Then, when the user determines that there is an inappropriate candidate among the candidates of "conclusion", "determination item", or "problem", etc., displayed in the action item input text box 804 by the conference support system 1, the user uses the icon of the trash box to perform an operation of deleting the inappropriate candidate. In this way, the conference support system 1 may delete a displayed candidate, based on a user's operation. Furthermore, when deleting the candidate, the conference support system 1 also corrects the label of the supervisor data. Then, the conference support system 1 uses the corrected data, that is, the statement contents and the labels, to relearn the classifier. Accordingly, the conference support system 1 can learn the classifier even more.

Furthermore, the user may perform an operation of adding candidates of "conclusion", "determination item", or "problem", etc., to be displayed in the action item input text box 804. That is, the user may add candidates that have not been cited by the conference support system 1, in the action item input text box 804. For example, the conference support system 1 displays a pull-down menu. Then, the user performs an operation of selecting a label to be added, from the pull-down menu. Note that the user may perform an operation of correcting the candidates displayed by the conference support system 1. Based on these correction results, the labels of the supervisor data are also corrected. In this way, the conference support system 1 may relearn the classifier.

In order to perform the above operations, for example, the following GUI is used.

Figure 17:
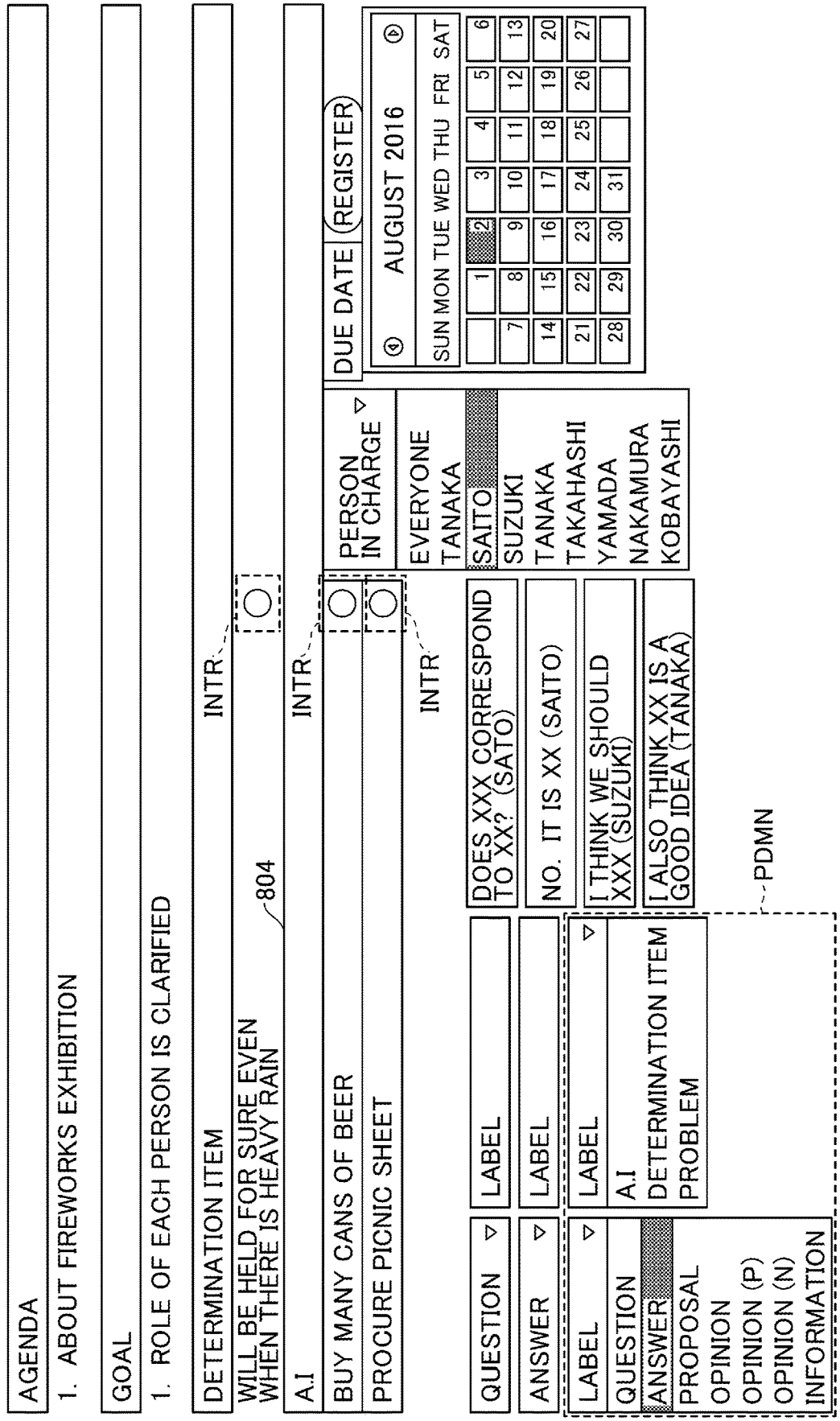
FIG. 17 illustrates an example of a graphical user interface (GUI) displayed by the conference support system according to the third embodiment of the present invention.

FIG. 17 illustrates an example of a GUI displayed by the conference support system 1 according to the third embodiment of the present invention. In the following, a description is given of an example in which the conference support system 1 displays the illustrated candidates in the action item input text box 804.

In this example, as illustrated, the conference support system 1 displays a trash box icon INTR beside each candidate. Then, when the trash box icon INTR is clicked, the conference support system 1 deletes the corresponding candidate.

Furthermore, in this example, as illustrated, the conference support system 1 displays a pull-down menu PDM. When this pull-down menu PDMN is operated, the conference support system 1 corrects or adds a label.

By the above GUI, the conference support system 1 corrects, adds, or deletes candidates.

Fourth Embodiment

A fourth embodiment is realized by, for example, the same overall configuration, hardware configuration, and functional configuration as those of the first embodiment. In the following, the different points are mainly described. The output by the outputting unit 1F4 (FIG. 3) of the fourth embodiment is different from that of the first embodiment.

A topic is a word indicating the theme, the topic of discussion, or the subject of a controversy, of a plurality of statement contents. For example, the conference support system 1 displays a topic as generated below.

Figure 18:
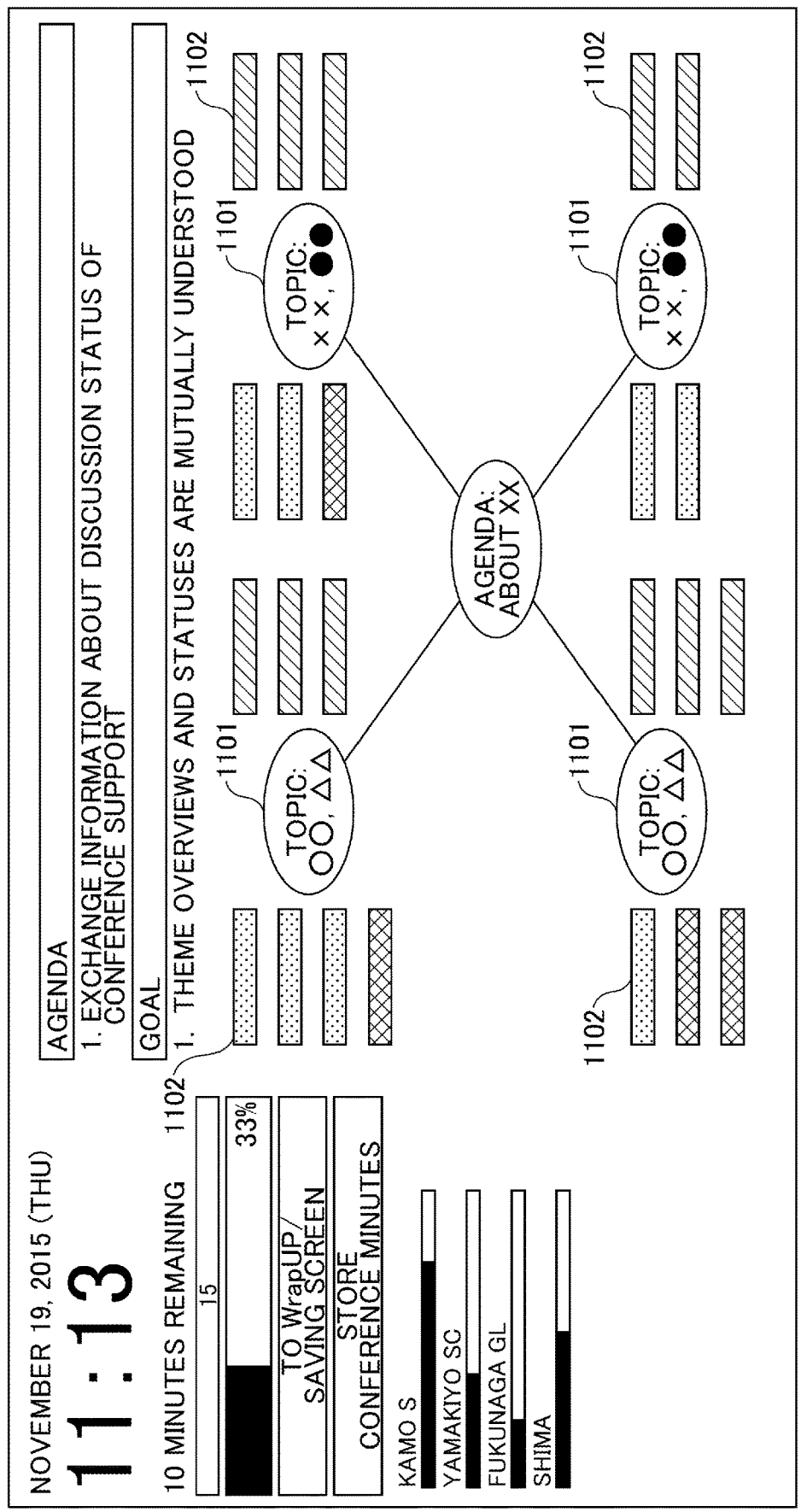
FIG. 18 illustrates an example of a display of topics generated by the conference support system according to a fourth embodiment of the present invention.

FIG. 18 illustrates an example of a display of topics generated by the conference support system 1 according to the fourth embodiment of the present invention. In the illustrated example, the conference support system 1 generates a topic 1101, and arranges and displays a statement content 1102 corresponding to each topic 1101.

The statement contents, which are stated during a conference, are often related to a plurality of topics 1101. Note that the statement contents, which are stated during a conference, may be related to a plurality of topics 1101, or may be related to the same topic 1101.

As illustrated, the statement contents 1102 are grouped in units of topics 1101. The statement contents 1102, which are grouped in units of topics 1101, are decorated according the type of each statement content 1102. Furthermore, in the illustrated example, among the statement contents 1102, the statement contents 1102 that are "positive opinions" are arranged on the left side, while the statement contents 1102 that are "negative opinions" and "problems" are arranged on the right side. In this way, when the statement contents 1102 are arranged according to the types of statement contents, the conference support system 1 can display the statement contents such that the user can easily and intuitively recognize the contents of the discussion.

Furthermore, when the statement content 1102 is long, the conference support system 1 may shorten the statement content 1102. For example, the conference support support system 1 performs a so-called sentence compression process, etc. That is, the conference support system 1 may convert each of the statement contents into a simple format, by sentence compression, etc.

Specifically, first, the conference support system 1 uses a sentence structure analysis tool, etc., to perform sentence structure analysis on the statement content. Then, the statement content is divided into a plurality of elements by the sentence structure analysis. Next, the conference support system 1 applies an importance level to each element. Next, the conference support system 1 deletes the elements having a low importance level, based on the importance levels. In this way, the conference support system 1 is able to reduce the elements in a sentence and shorten the statement content, without destroying the structure of the sentence.

Furthermore, for example, the importance levels are set as follows.

Nouns, proper nouns, nominative cases, and objective cases have high importance levels.

Elements including "etc." indicating examples and "or" that is a particle, adverbs, and modifiers have low importance levels.

Therefore, the conference support system 1 deletes modifiers, embedded words, and dependent clauses, etc., to perform sentence compression and shorten the statement content. Furthermore, sentence compression is performed by a method disclosed in, for example, "The basics of natural language process", written by Manabu Okumura and published by Corona Publishing, Co., Ltd.

As described above, when topics are displayed by the conference support system 1, the user can easily review the conference. That is, when the conference support system 1 displays "problems", "action items", and "determination items" associated with the topics, the user can efficiently summarize the conference.

Furthermore, in the GUI illustrated in FIG. 17, the user may add candidates of "problem", "action item", and "determination item". In this case, the conference support system 1 may extract statement contents related to the added candidates. For example, the extraction results are displayed in a screen as described below.

FIG. 19 illustrates an example of displayed results extracted by the conference support system 1 according to the fourth embodiment of the present invention. For example, in the illustrated example, the conference support system 1 displays the results extracted from "action item" and "determination item", in a text box INBX, etc.

Furthermore, in the text box INBX, a statement content may be displayed in a full sentence format. Note that FIG. 19 illustrates an example of displaying the statement contents grouped according to boundaries estimated by a method of estimating topic boundaries described below, including candidate statements of "action item", in the text box INBX. That is, the illustrated text box INBX displays an abstract. On the other hand, the text box INBX may display a full text AL. That is, the text box INBX may switch to displaying the full text. AL. Furthermore, for example, the abstract is generated from the full text AL.

For example, the extraction result is generated by the fourth estimation method and the calculation of similarity described below. Specifically, first, the conference support system 1 expresses the statement contents, which have been grouped according to boundaries estimated by the method of estimating topic boundaries described below, and the candidates, with document vectors. Next, the conference support system 1 calculates the goodness of fit based on a cosine similarity, etc. Then, the conference support system 1 extracts, or associates together, statement contents and candidates having high similarities. These methods are realized by methods disclosed in, for example, "The basics and techniques of natural language process", written by You Okuno, et al., and published by SHOEISHA Co., Ltd., and "http://www.cse.kyoto-su.ac.jp/~g0846020/keywords/cosinSimilarity.html".

As a result, as illustrated, some of the statement contents, which are extracted from all of the statement contents, are displayed in the text box INBX. Furthermore, a plurality of statement contents, which are divided into groups of topics, are displayed in the text box INBX.

Specifically, when there is a statement content that is determined to be a "problem", a "determination item", or an "action item" in a discussion about a certain topic, the statements indicating these types are extracted into the text box INBX.

Furthermore, as illustrated, statements, which indicate a "problem", a "determination item", or an "action item", related to statements indicating the extracted contents of "action item", may be displayed in the text box INBX.

Note that the conference support system 1 is not limited to being used when the conference ends. For example, the conference support system 1 may be used when the conference minutes are input after the conference ends. Furthermore, the distances between topics are preferably set such that missed topics and overlapping topics are reduced, by a method disclosed in, for example, "http://ryotakatoh.hatenablog.com/entry/2015/10/29/01_5502" and "http://techsketch.jp/2015/09/topic-model.html".

Note that the topics 1101 are generated as follows, for example.

Figure 20:
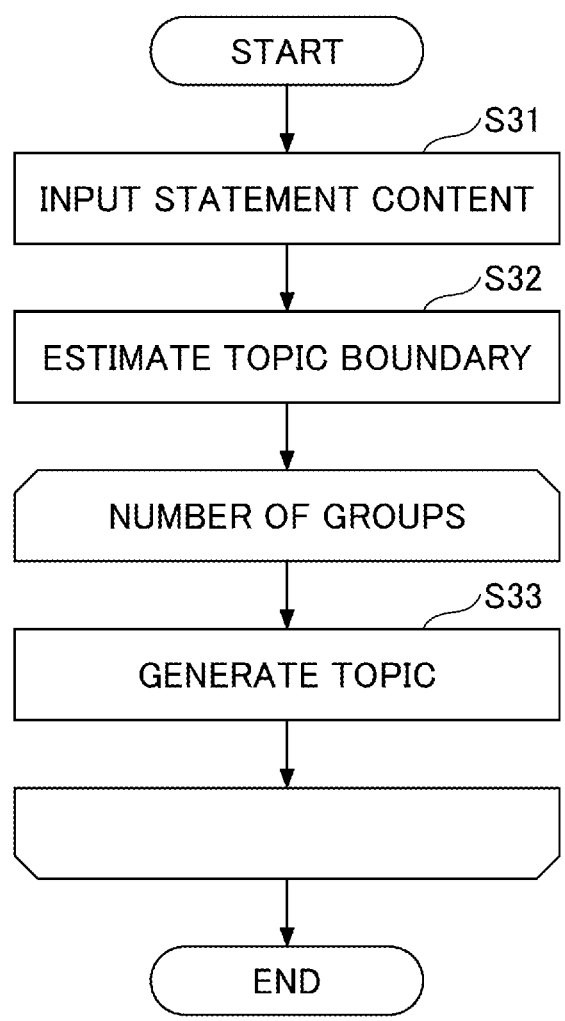
FIG. 20 is a flowchart of an example of generating topics by the conference support system according to the fourth embodiment of the present invention.

FIG. 20 is a flowchart of an example of generating topics by the conference support system 1 according to the fourth embodiment of the present invention. For example, when the illustrated process is performed, a screen as illustrated in FIG. 18 is displayed by the conference support system 1.

In step S31, the conference support system 1 inputs a statement content. For example, after a conference for which the conference support system 1 has been used is ended, the conference support system 1 is in a state where the statement contents stated during the conference have been input.

In step S32, the conference support system 1 estimates the topic boundary. Specifically, the topics are generated with respect to the groups of statement contents, and therefore, first, the conference support system 1 classifies the statement contents into groups. Therefore, the conference support system 1 estimates the topic boundary separating the groups. For example, the conference support system 1 estimates the topic boundary, such that statement contents having common contents or statements contents estimated to be highly related to each other, are included in the same group.

For example, the topic boundary is estimated by the four methods described below.

First, the first estimation method is a method of estimating a topic boundary when "a keyword explicitly indicating the transition of topic is detected". Note that specific keywords, by which the transition of a topic can be estimated, are "to come to think of it" and "by the way", etc. Furthermore, these keywords are set by the user of the conference support system 1 in advance, for example, before the conference.

Furthermore, the second estimation method is a method of estimating a topic boundary when "a word indicating the replacement of the conversation leader is detected". Specifically, in the second estimation method, when a word such as "a little while ago", "the other day", and "a long time ago", etc., is stated, it is estimated that there is a topic boundary. Furthermore, these keywords are set by the user of the conference support system 1 in advance, for example, before the conference.

Note that the first and second estimation methods are methods disclosed in "Real-time Topic Segmentation of information seeking chat", written by Yuichi Miyamura, Takenobu Tokunaga, Department of Computer Science, Graduate School of Information Science and Engineering, Tokyo Institute of Technology, "http://www.cl.c-s.titech.ac.jp_media/publication/632.pdf".

Furthermore, the third estimation method is a method of estimating that there is a topic boundary when a statement content of a "question" type is stated. That is, when there is a statement content determined to be a "question", the conference support system 1 estimates that there is a topic boundary.

Furthermore, the fourth estimation method is a method of estimating a topic boundary by using "lexical cohesion". In the fourth estimation method, for example, the "lexical cohesion" is calculated by using a thesaurus, etc. Specifically, first, the conference support system 1 detects a link formed by an assembly of statement contents having a "lexical cohesion" relationship, that is, a so-called "lexical chain". Then, in the fourth estimation method, a "lexical cohesion" is considered to indicate a meaningful assembly of statement contents, and the portions corresponding to the starting point and the ending point of the "lexical chain" are estimated to be topic boundaries. For example, the fourth estimation method is a method disclosed in "Text segmentation based on lexical cohesion", written by Takeo Honda and Manabu Okuruma, Japan Advanced Institute of Science and Technology, "https://ipsj.ixsq.nii.ac.jp/ej/index.php?action=page s_view_main&active action=repository_action_common_do wnload&item id=49265&item no=1&attribute_id=l&file_no=1&page_id=13&block_id=8", and "The basics of natural language process", written by Manabu Okumura and published by Corona Publishing, Co., Ltd.

In step S33, the conference support system 1 generates a topic. That is, in step S33, the conference support system 1 generates topics at the respective topic boundaries estimated in step S32. Therefore, step S33 is repeatedly performed for the number of groups that are separated by the topic boundaries.

For example, a topic is generated by the two methods described below.

The first generation method includes extracting a statement content that is a proper noun or a word that is not registered in a dictionary, that is, a so-called unknown word, from the statement contents grouped by the topic boundaries, and setting the extracted statement content as a topic.

Furthermore, in the second generation method, first, nouns, verbs, or adjectives are extracted from the statement contents that have been grouped by topic boundaries. Next, in the second generation method, the conjugation of the extracted statement content is changed back to the original form. Then, a statement content that is frequently stated is set as a topic. In this way, the conference support system 1 can display a topic, etc.

Note that all of or part of the processes according to embodiments of the present invention may be realized by programs for causing a computer for executing the procedures of the conference support method, described in a programming language or an object-oriented programming language such as an assembler, C, C++, Java (registered trademark), JavaScript (registered trademark), Ruby, and PHP: Hypertext Preprocessor, etc. That is, the program is a computer program for causing a computer of an information processing apparatus or the conference support system 1 including one or more information processing apparatuses to execute procedures.

Furthermore, the program may be distributed by being stored in a computer-readable recording medium such as a read-only memory (ROM) or an Electrically Erasable Programmable ROM (EEPROM), etc. Furthermore, the recording medium may be an Erasable Programmable ROM (EPROM), a flash memory, a flexible disk, a compact disc ROM (CD-ROM), a compact disc-ReWritable (CD-RW), a Digital Versatile Disc-ROM (DVD-ROM) a DVD-Random Access Memory (DVD-RAM), a DVD-RW, a Btu-ray disc (registered trademark), a secure digital (SD) (registered trademark) card, or a magneto-optic (MO) disc, etc. Furthermore, the program may be distributed through an electric communication line.

Furthermore, the the conference support system 1 may include two or more information processing apparatuses that are connected to each other via a network, etc. That is, the conference support system 1 may perform all of or part of the processes in a distributed manner, in a parallel manner as in a duplex system, or in a redundant manner as in a dual system.

According to one embodiment of the present invention, the efficiency of a conference can be increased.

The conference support system, the conference support method, and the recording medium are not limited to the specific embodiments described in the detailed description, and variations and modifications may be made without departing from the spirit and scope of the present invention.

What is claimed is:

1. A system including one or more server apparatuses, the system comprising:
   circuitry configured to input a plurality of statements made by a plurality of participants of a conference;
   store the statements in a memory during the conference;
   identify each participant, among the plurality of participants, that made a statement among the plurality of statements;
   display feedback for each identified participant, after the conference, based on topics of the statements stored in the memory;
   determine an action item from the statements;
   shorten contents of the statements by a sentence compression process;
   display the determined action item;
   group the statements by topic into groups; and display the contents of the statements shortened by the sentence compression process in association with topics to which the statements belong.

2. The system of claim 1, wherein the circuitry is further configured to output a part of a statement, among the plurality of statements, in a format that is previously determined according to a type of the statement.

3. The system of claim 1, wherein the circuitry is further configured to:
identify a particular participant, among the plurality of participants, who has made a statement among the plurality of statements, and
output the statement in association with the identified particular participant.

4. The system of claim 1, wherein the circuitry is further configured to output a statement, which corresponds to a particular statement type, from among the plurality of statements input by the circuitry.

5. The system of claim 1, wherein the circuitry is further configured to generate the feedback based on a number of statements and a type of a statement among the plurality of statements.

6. The system of claim 1, wherein the circuitry is further configured to:
calculate a cost based on personnel expenses of the plurality of participants in the conference, and
output the cost.

7. The system of claim 5, wherein the circuitry is further configured to generate the feedback based on a difference between a time spent for the conference and a time scheduled for the conference.

8. The system of claim 1, wherein the circuitry is further configured to:
identify a particular participant, among the plurality of participants, who has made a particular statement among the plurality of statements;
generate a particular feedback for the particular participant based on a number of statements made by the particular participant and a type of the particular statement; and
output the particular feedback.

9. The system of claim 5, wherein the circuitry is further configured to generate the feedback based on a subjective evaluation having been input by the circuitry.

10. The system of claim 1, wherein
the circuitry is further configured to train a classifier to determine a type of a statement among the plurality of statements,
the classifier determines the type of the statement based on at least one of features of the statement, a role of a participant of the plurality of participants, or a type of the conference, and
the at least one of features include at least one of adverb, adjective, noun or auxiliary verb of the statement.

11. The system of claim 1, wherein
the circuitry is further configured to train a classifier to determine a type of a statement among the plurality of statements,
the classifier determines the type of the statement based on at least one of features of the statement, a role of a participant of the plurality of participants, or a type of the conference, and
the circuitry is further configured to determine the type of the statement based on the identity of a participant who has made the statement.

12. The system of claim 1, wherein the circuitry is further configured to:
determine a topic boundary for classifying the plurality of statements into the groups, and
generate a topic, for each group among the groups, defined by the topic boundary.

13. The system of claim 12, wherein for each group among the groups, a respective topic represents at least one of a subject, theme, feature, or issue of the statements belonging to the group.

14. The system of claim 12, wherein the circuitry is further configured to:
translate a statement, among the plurality of statements, into a language different than a language of the statement having been input to generate a translated statement, and
output the translated statement.

15. The system of claim 1, wherein the circuitry is further configured to output information indicating contribution to the conference made by a participant among the plurality of participants.

16. The system of claim 1, wherein the circuitry is further configured to output information indicating contributions to the conference made by each participant among the plurality of participants.

17. The system of claim 1, wherein the output feedback is output based on a number of the statements per unit time.

18. The system of claim 1, wherein the circuitry is configured to input the plurality of statements from voice sounds.

19. The system of claim 18, wherein the circuitry is further configured to perform voice recognition on the plurality of statements input from the voice sounds.

20. An information processing apparatus, comprising circuitry configured to:
input a plurality of statements made by a plurality of participants of a conference;
store the statements in a memory during the conference;
identify each participant, among the plurality of participants, that made a statement among the plurality of statements;
display feedback for each identified participant, after the conference, based on topics of the statements stored in the memory;
determine an action item from the statements;
shorten contents of the statements by a sentence compression process;
display the determined action item;
group the statements by topic into groups; and
display the contents of the statements shortened by the sentence compression process in association with topics to which the statements belong.

21. A method, comprising:
inputting a plurality of statements made by a plurality of participants of a conference;
storing the statements in a memory during the conference;
identifying each participant, among the plurality of participants, that made a statement among the plurality of statements;
displaying feedback for each identified participant, after the conference, based on topics of the statements stored in the memory;
determining an action item from the statements;
shortening contents of the statements by a sentence compression process;
displaying the determined action item;
grouping the statements by topic into groups; and displaying the contents of the statements shortened by the sentence compression process in association with topics to which the statements belong.

22. A non-transitory computer-readable recording medium storing instructions, which when executed, cause a processor to:
  input a plurality of statements made by a plurality of participants of a conference;
  store the statements in a memory during the conference;
  identify each participant, among the plurality of participants, that made a statement among the plurality of statements;
  display feedback for each identified participant, after the conference, based on topics of the statements stored in the memory;
  determine an action item from the statements;
  shorten contents of the statements by a sentence compression process;
  display the determined action item;
  group the statements by topic into groups; and
  display the contents of the statements shortened by the sentence compression process in association with topics to which the statements belong.

\* \* \* \* \*